United States Patent
Henkel

[11] Patent Number: 5,280,773
[45] Date of Patent: Jan. 25, 1994

[54] METHOD AND APPARATUS FOR INJECTING FUEL INTO A COMBUSTION CHAMBER OF AN AIR COMPRESSING, SPONTANEOUS IGNITION, INTERNAL COMBUSTION ENGINE

[76] Inventor: Dietmar Henkel, Kopernikusring 50, 8340 Neumarkt, Fed. Rep. of Germany

[21] Appl. No.: 608,307
[22] Filed: Nov. 2, 1990

[30] Foreign Application Priority Data
Nov. 3, 1989 [DE] Fed. Rep. of Germany ....... 3936619

[51] Int. Cl.$^5$ ............................................ F02M 41/00
[52] U.S. Cl. .............................. 123/467; 123/300; 251/129.06
[58] Field of Search ............... 123/467, 472, 446, 299, 123/300, 456; 251/129.06

[56] References Cited

U.S. PATENT DOCUMENTS

| | | | |
|---|---|---|---|
| 2,887,294 | 5/1959 | Hahn | 251/129.06 |
| 3,055,631 | 9/1962 | Kippenhan | 251/129.06 |
| 3,857,543 | 12/1974 | McKeen | 251/129.06 |
| 4,221,192 | 9/1980 | Badgley | 123/456 |
| 4,669,660 | 6/1987 | Weber | 251/129.06 |
| 4,722,310 | 2/1988 | Igashira | 123/300 |
| 4,726,389 | 2/1988 | Minoura | 251/129.06 |
| 4,779,596 | 10/1988 | Babitzka | 123/467 |
| 4,782,803 | 11/1988 | Kikuchi | 123/300 |
| 4,838,231 | 6/1989 | Ganser | 123/467 |

FOREIGN PATENT DOCUMENTS 2854921 7/1979 Fed. Rep. of Germany.

*Primary Examiner*—Carl S. Miller

[57] ABSTRACT

A method and apparatus for injecting fuel into a combustion chamber of an air compressing, spontaneous ignition, internal combustion engine are provided. An adjustment member of an injector is actuated electrically and is controlled via an electronic circuitry, with the fuel quantity being withdrawn from a pressure chamber. The adjustment member acts upon a release sectional area of a restrictor. An adjustment member in the form of a magneto strictive rod is provided. The release sectional area is controlled by a control voltage, generated by the electronic circuitry, and can be chronologically modulated.

21 Claims, 11 Drawing Sheets

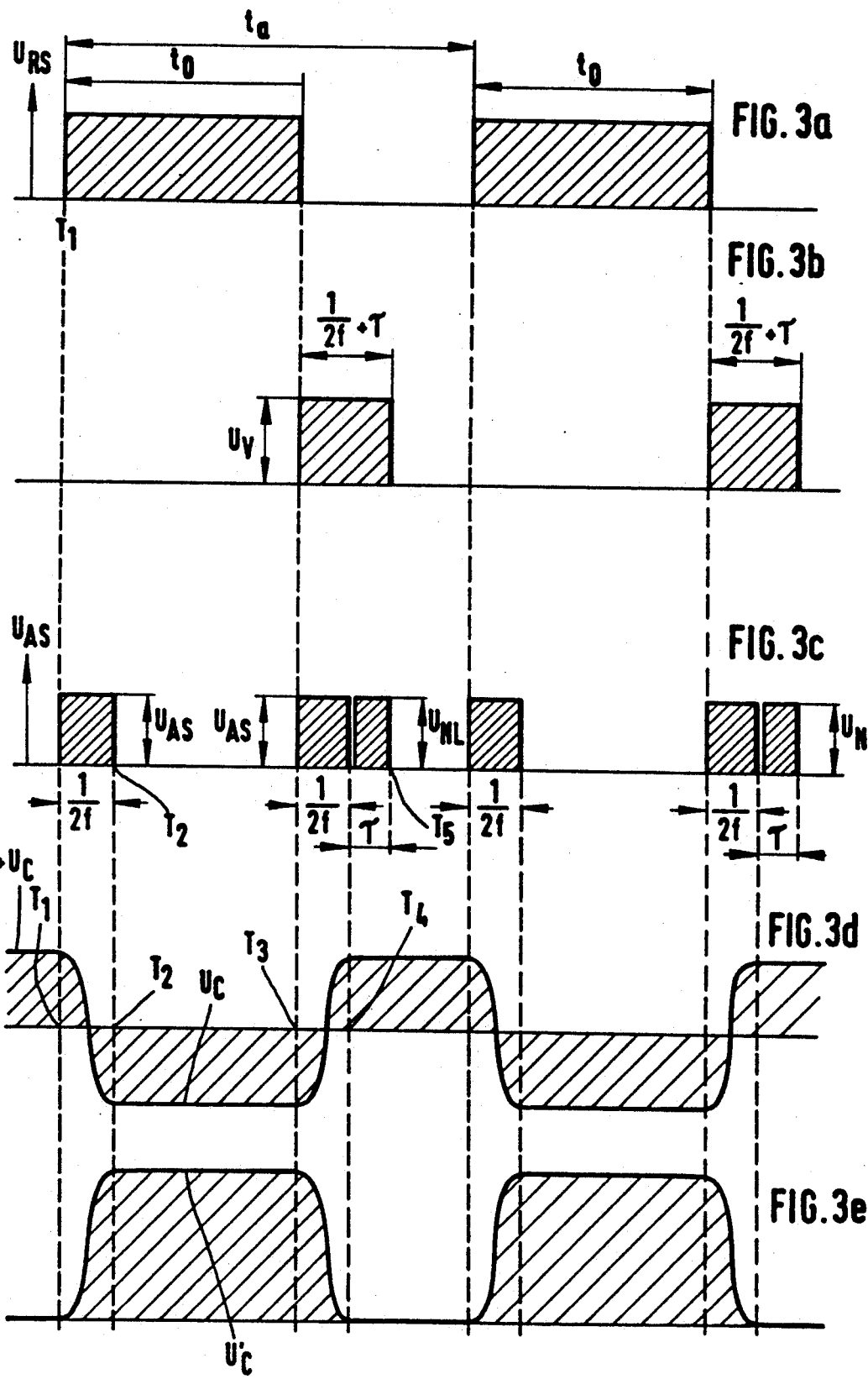

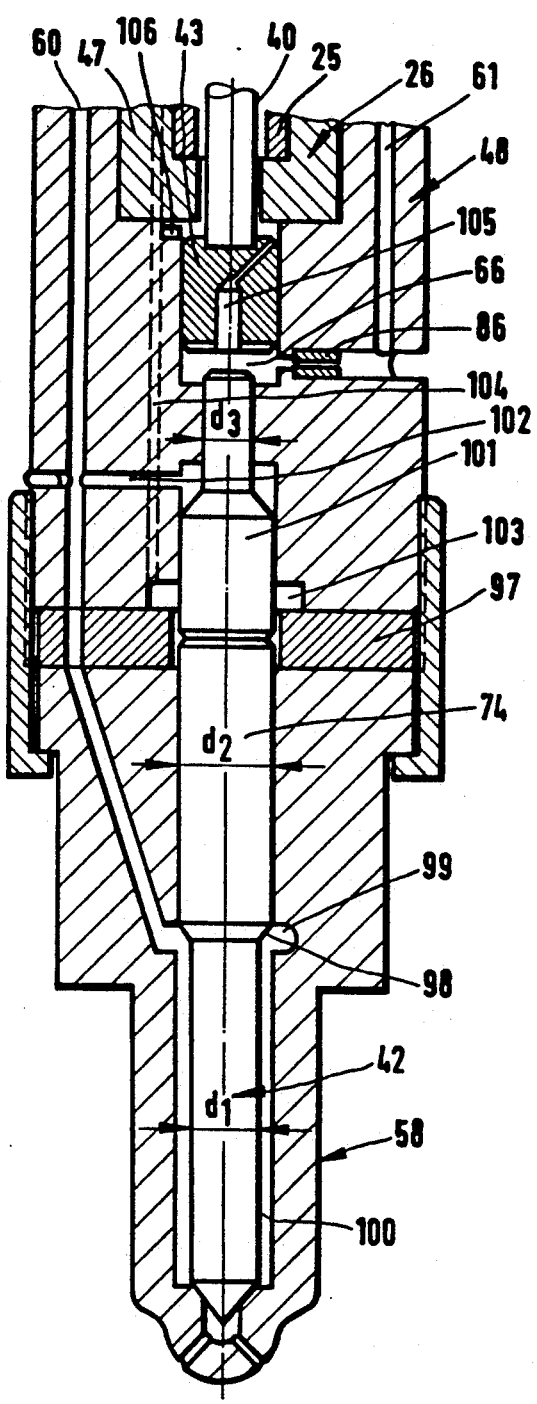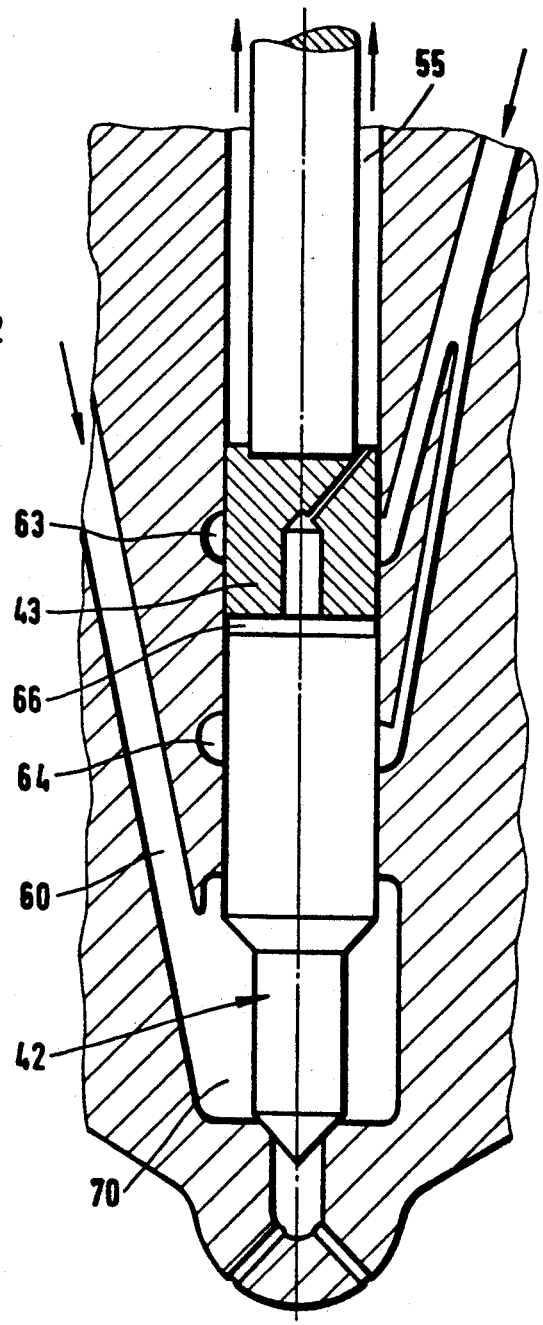

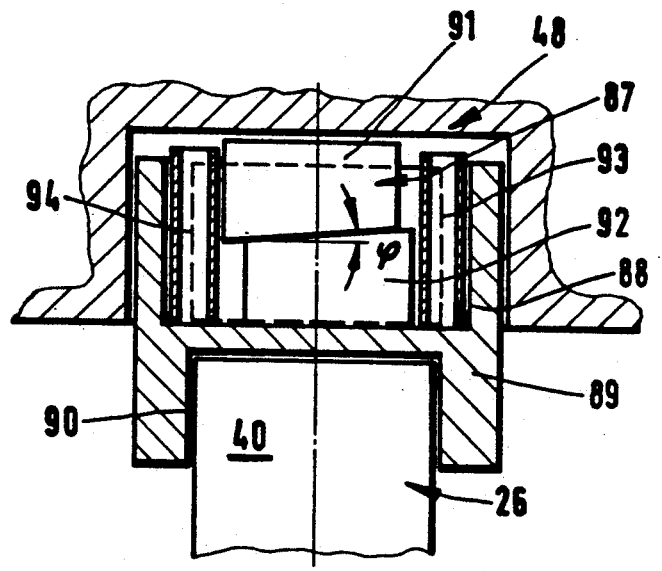
FIG. 14
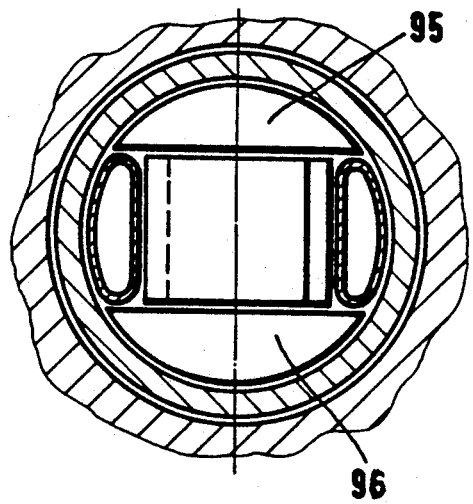
FIG. 15
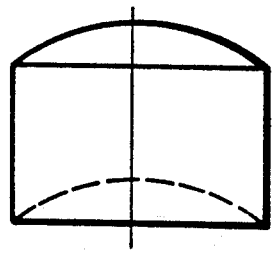
FIG. 16
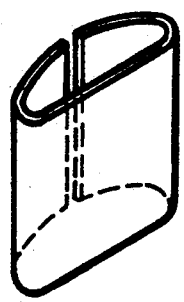 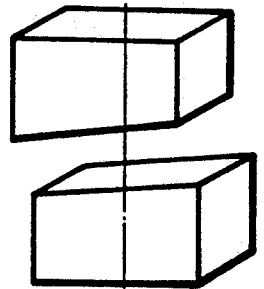 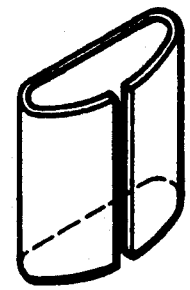
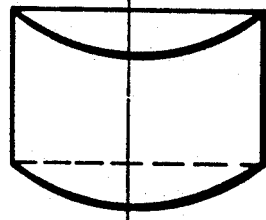

METHOD AND APPARATUS FOR INJECTING FUEL INTO A COMBUSTION CHAMBER OF AN AIR COMPRESSING, SPONTANEOUS IGNITION, INTERNAL COMBUSTION ENGINE

BACKGROUND OF THE INVENTION

The present invention relates to a method of injecting fuel into a combustion chamber of an air compressing, spontaneous ignition, internal combustion engine, with an adjustment member of a fuel injection nozzle or injector being actuated electrically and being controlled via an electronic circuitry, with the fuel quantity being withdrawn from a pressure chamber. The present invention also relates to various apparatus for carrying out such a method.

Increasingly stricter legislation with regard to the permissible levels of polluting emissions (hydrocarbons, nitrogen oxides), and also with respect to black smoke that is discharged, cause the developers of Diesel engines to strive to influence and control the course of combustion within an engine in such a way as to fulfill the aforementioned requirements.

The requirements for an ideal injection system are many, including, for example: performance range control of quantity, duration, and chronological beginning of "preliminary injection" and "main injection", which is ultimately a basis of an appropriate control of the fuel pressure in the injector chamber that determines the quality of the vaporization. With respect to a more uniform fuel distribution in the combustion chamber, it should furthermore be possible to be able to influence not only the mean drop magnitude (of the vaporized fuel), as well as the angle of the conical envelope, which includes the axial injection stream expansion, and t o do so intentionally within certain limits during an injection process It would also be advantageous to be able to additionally influence the penetration depth of the stream of drops into the combustion chamber.

Approaches that cover a portion of the aforementioned requirements have in the meantime become available via so-called pump-injector systems. The high injection pressure that can be realized therewith, accompanied by the resulting improved degree of vaporization of the fuel, explains, due to the better mixture preparation that is achieved, primarily the significant reduction in black smoke. Versions of the pump-injector system that are provided with by-pass pistons as means to realize a preliminary injection finally permit a shortening of the inition lag, resulting in a reduction in combustion noise. The realized performance range control of ignition start and ignition duration via electromagnetically controlled bypass valves (parallel to the injector) represents a high degree of flexibility with regard to influencing the course of combustion. The objective of ensuring for each load and speed point of the engine also always an optimum fuel introduction cannot always be fulfilled by the pump-injector concept. One of the problems is the dependency, which is known and encountered with conventional injection pumps, of the speed with which the injection quantity and pressure can be provided upon the momentary engine speed (displacement speed of the plunger). In order, for example to realize high injection quantities (per stroke) in respectively short time intervals at a low engine speed, another technique was required.

DE-OS 28 54 921 discloses an injector that is provided with electromagnetic actuation of the injector needle valve. A solenoid that actuates the injector needle valve can be excited by an electronic control mechanism. With such a feature the movement of the injector needle valve and hence the injection process, can be preprogrammed. However, the chronological movement progress of the injector needle valve is considerably limited by the inertia thereof, so that the possibilities for an electronic control can be utilized only to a limited extent precisely due to this inertia of the injector needle valve.

It is therefore an object of the present invention to induce the injected quantity of fuel as a function of time in order, for a more homogeneous mixture preparation, to be able to freely control the parameters of penetration depth and cone angle of the injection stream as well as the drop magnitude spectrum.

BRIEF DESCRIPTION OF THE DRAWINGS

This object, and other objects and advantages of the present invention, will appear more clearly from the following specification in conjunction with the accompanying schematic drawings, in which:

FIGS. 3a-3e show signals of the constant frequency generator of FIG. 3;

FIG. 11 shows an exemplary embodiment of an injector with an injector needle valve being embodied as a piston;

FIG. 14 is a cross-sectional view through an expanding wedge-type bearing means;

FIG. 15 is a cross-sectional view through the expanding wedge-type bearing means;

FIG. 16 is an exploded view of the expanding wedge-type bearing means; and

FIG. 17 shows an injection valve having a purely hydraulic adjustment of the adjustment member.

SUMMARY OF THE INVENTION

The method of the present invention is characterized primarily in that the adjustment member acts upon a release sectional area of a restrictor means; an ajustment member in the form of a magneto strictive rod is provided; and the release sectional area is controlled by a control voltage, generated by the electronic circuitry, and can be chronologically modulated.

By controlling the adjustment member via an electronic circuitry, one is in a position to vary the movement sequence of an injector needle valve that is coupled with the adjustment member as intended in order in this manner to provide the chronological progress of combustion in conformity with the desired form. An essentially more flexible configuration of the movement sequency of the injector needle valve is provided in particular in conjunction with a magneto strictive rod for realizing the adjustment member operation, since in contrast to an electromagnetic actuation, the inertia is nearly eliminated.

Further specific features of the present invention will be described in detail subsequently, and describe in particular advantageous modulations of the movement sequence of the adjustment member, as well as apparatus for carrying out the inventive method.

DESCRIPTION OF PREFERRED EMBODIMENTS

Figure 1:
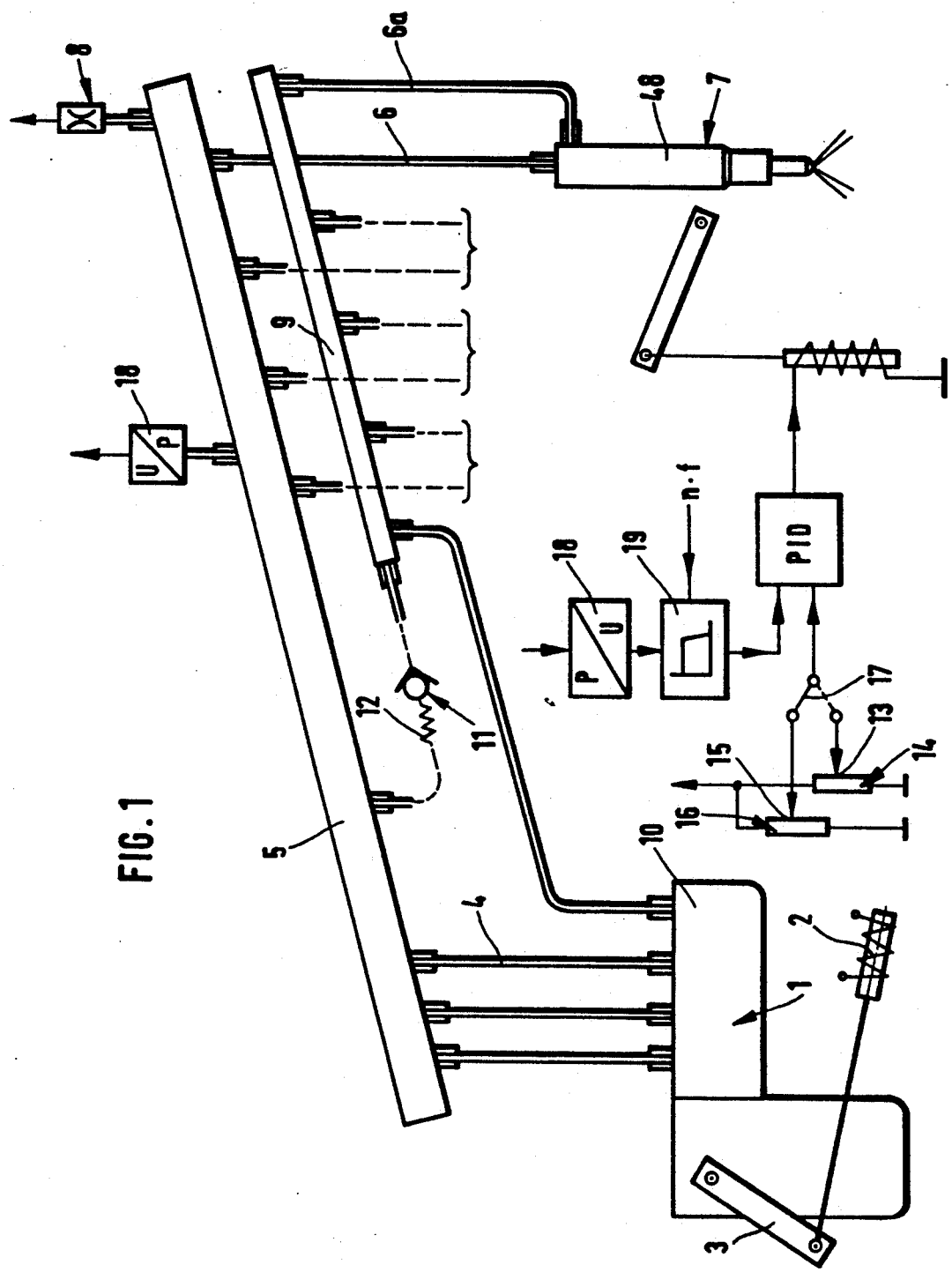
FIG. 1 is a schematic illustration of an injection system.

A schematic illustration of an injection system is shown in FIG. 1.

A conventional series injection pump 1 serves as a pressure generator. In view of the high feed pressure (1400 bar), the cam shape should be such that the piston of the pump element carries out a nearly harmonic movement (center offset circle or the like as a cam profile). The fuel quantity that is fed at any given moment is determined by the position of an adjustment member (in the illustrated embodiment the armature of a solenoid or electromagnet 2). As an alternative, an adjustment member that is realized with disc rotor motors is also conceivable, with such an adjustment member acting directly upon a charging lever 3 of the pressure generator and in turn being a component of a constant pressure regulator for the chamber pressure The fuel quantities generated by the individual pump elements of the series injection pump 1 are conveyed via the short tube sections 4 to a pressure chamber 5, which is embodied as a tubular member. At a prescribed length, the inner diameter of the pressure chamber 5 is such that the resulting internal volume is at least 0.5 dm$^3$.

One advantage of the tubular shape of the pressure chamber 5 is the realization of very short injection lines 6 from the pressure chamber 5 to injector holders 48, which in a manner similar to the pump/nozzle/system, aids in effectively precluding uncontrollable, wave mechanical impacts upon the injection pressure.

The pressure chamber 5 must have a minimum inclination relative to the horizontal in order to effect an automatic venting. For example, a continuous venting means that is disposed at the highest point of the pressure chamber 5 and is in the form of a capillary tube or an adjustable flow control device 8 provides for continuous withdrawal of gas from the pressure chamber 5.

Due to the manner of operation, as will be described in detail subsequently, of a pressure-type release valve in a fuel injection nozzle or injector 7, at the very beginning of start up an auxiliary pressure must be available that to avoid an undesired opening movement of the injector needle valve, builds up considerably more rapidly than the pressure in the pressure chamber 5. This auxiliary pressure is made available via a second pressure chamber 9, which is supplied with fuel via a separate pump element 10 of the series injection pump 1. Since only small quantities of fuel have to be taken from this second pressure chamber 9 (leakage of a later-to-be-described auxiliary piston system that is disposed in the injector 7), this second pressure chamber requires a storage volume that is only approximately 8% of the volume of the pressure chamber 5. The excess quantities of fuel conveyed from the second pressure chamber 9 pass via an overflow or relief valve 11 into the pressure chamber 5, where they are used to raise the pressure A further function of the relief valve 11 is the constant regulation of the pressure in the second pressure chamber 9. By prestressing a valve spring 12, it is possible to adjust the theoretical value of the pressure in the second pressure chamber 9, thus also ensuring the requirement for the starting procedure that a higher pressure level always be available in the chamber 9.

A tubular member is again the recommended shape for the second pressure chamber 9. For an automatic venting, an inclined disposition is advisable, as was the case with the pressure chamber 5. In contrast to the illustration of FIG. 1, to ensure the automatic venting the relief valve 11, as a connection between the pressure chambers 5 and 9, can be provided at the two, geodetically highest ends of the tubes.

The control circuit for ensuring the constancy of the working pressure in the pressure chamber 5 is in the form of a conventional PID (Proportional-Integral-Differential)-controller. In this connection, the theoretical value for the normal operation of the engine, for realizing a fine adjustment, is taken in the form of an electrical voltage from a slider 13 of a potentiometer 14 that is supplied with a constant voltage. At the moment that the engine is started, a reduced theoretical value, originating from a second slider 15 of a second potentiometer 16, is to be supplied to the input of the pressure regulator in order to keep the waiting time until the operating pressure is reached in the pressure chamber 5 short. This time, as well as the time to fill an axial hydraulic gap in the auxiliary piston system of a pressure relief valve, ultimately determine the waiting time until release of the fuel injection for the start up. Assignment of the respective theoretical value is controlled in a straightforward manner by a speed comparator that in turn controls a reversing switch 17 as a function of whether the motor is in a start up phase or in normal operation. To obtain the actual value of the chamber pressure, a conventional diaphragm pressure receiver 18 based on the piezoresistive wire strain method is utilized. Expediently connected to the electrical output signal of the diaphragm pressure receiver 18 is a low-pass filter 19 to suppress the pressure harmonics. To satisfy exacting instances of a pressure regulation of optimum rapidity, the cutoff frequency of the low-pass filter 19 should have a certain multiple (approximately a factor of 3) of the ignition sequence frequency of the engine. This requirement can be realized with the aid of a so-called "switched-capacitor-filter", the activation of which can be derived from the ignition sequence frequency that is obtained per pulse generator (radially disposed relative to a starter ring gear 20, as shown in FIG. 2), with the operation of such filters being known.

The very high speed with which the magnetostrictive adjustment member 26 (FIG. 10) that is to be described subsequently can be adjusted, together with the very good reproducibility of the movement efficiency per unit of electrical control current, makes it clear that the initially listed duties or specifications of a reduced-size injection unit can be achieved only in cooperation with the efficient hardware and software of modern control and performance circuitry.

The aspects of the control concept that are critical for the example of a single cylinder engine will be described subsequently.

Figure 2:
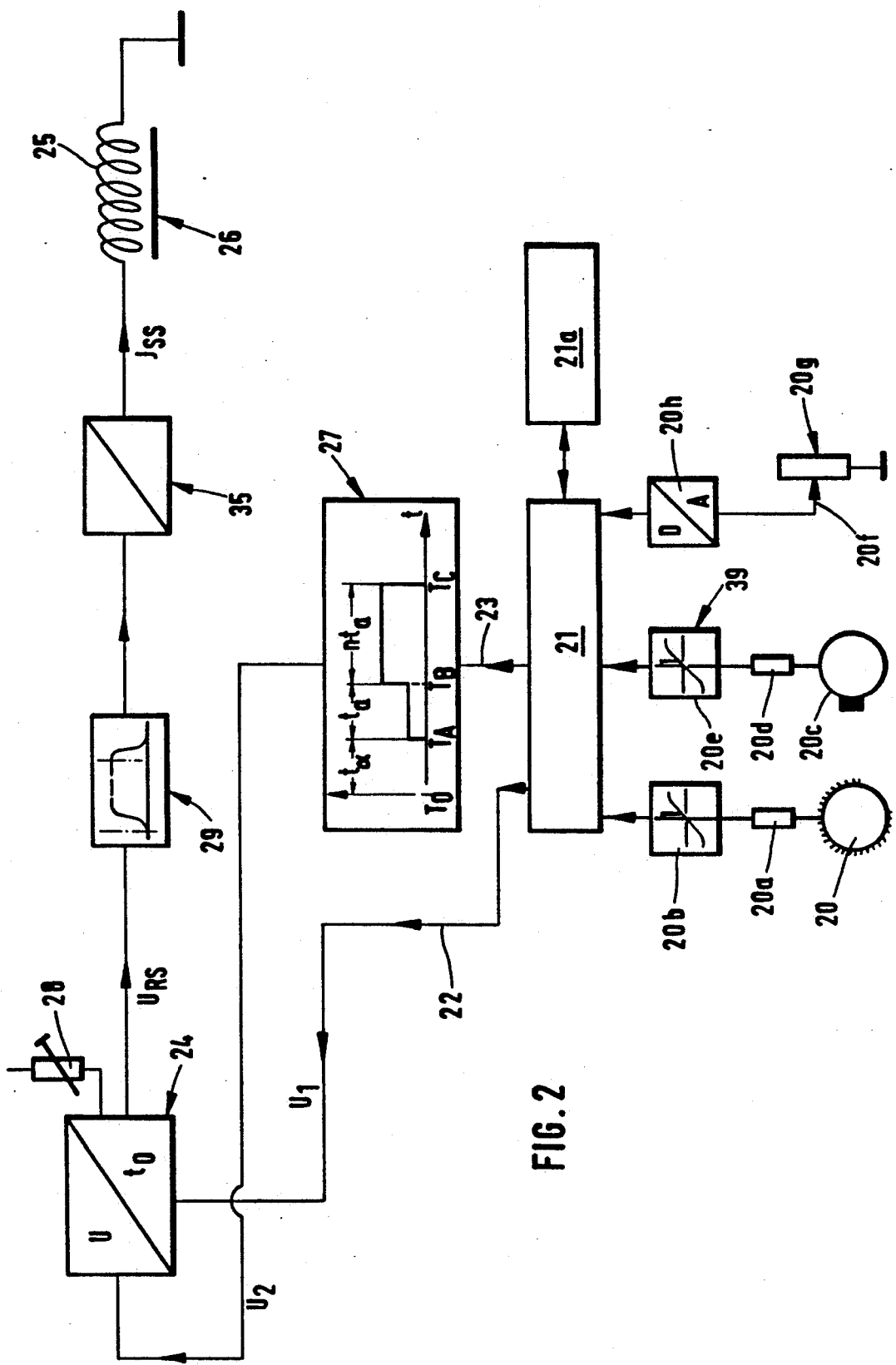
FIG. 2 shows an electronic circuitry for controlling a solenoid of an adjustment member.

The microprocessor 21 including the performance range register 21a, shown in FIG. 2 serve for the realization of a performance range control for the beginning of initiation and the time function of the introduced quantity of fuel, with the performance range control being a function of load and speed. The speed, as a required condition parameter of the engine, and at the same time an independent variable of the performance range, is obtained via a first pulse generator 20a that is disposed radially at the starter ring gear 20. In the subsequently connected zero crossing detector 20b (including pulse shaper), the output voltage of the pulse generator 20a receives a form that can be processed by the microprocessor 21. In essentially the same manner there is obtained the reference time $T_0$ that is significant for the initiation of injection. An electromagnetic second pulse generator 20d that for this purpose is similarly radially disposed, although this time on a magnetic discontinuity, at the periphery of a cam shaft 20c, serves, in cooperation with the pulse processing unit 20e, to again provide a microprocessor-compatible signal form. The charging of the engine, as the second independent variable of the performance range, is effected via analog representation of the position of the gas pedal via the slider 20f at the second potentiometer 20g, which is supplied with a constant voltage. A subsequently connected analog/digital converter 20h is responsible for the formation of a signal shape that the microprocessor 21 can accept.

As shown in FIG. 2, the microprocessor 21 communicates with the performance circuitry via two signal paths 22 and 23, whereby the microprocessor communicates the start/stop signal via the first signal transmitter or path 22 to start or stop the pulse duration modulator 24, which in turn delivers the resonant signal for the current $J_{ss}$ that flows through the solenoid 25 of an adjustment member 26.

The other output signal of the microprocessor 21 passes via the second signal path 23 through a digital-/analog converter 27, generating at the output thereof, in a manner that is correct with regard to phase and ignition sequence, the time function of a voltage from which originates a control of the aforementioned resident signal pattern of the solenoid energizing current. The components of the system that affect the solenoid current $J_{ss}$ will now be described in detail.

The task of the pulse duration modulator 24 is to generate a carrier frequency signal that must satisfy three different requirements. On the one hand, this carrier frequency signal should comprise a series of rectangular pulses of constant sequence frequency $$\frac{(1)}{ta},$$

which is manually adjustable via a second potentiometer 28, whereby the sequence frequency must be less by a factor of at least 0.7 than that of the resonance frequency of the adjustment member 26. Secondly, the duration $t_0$ of the individual rectangular pulses should, via a direct voltage $U_2$ or a nearly arbitrary time function for $U_2$, be controllable proportional to the voltage level (FIGS. 5-9). Thirdly with the aid of a start/stop signal of the periodic duration $tg = n \cdot ta$ (n=an integer or a fraction) it should finally be possible to activate the pulse duration modulator 24 only within this time period, and in particular at the beginning in the time interval t after the appearance of the time mark $t_0$ (see $U_2$ in FIGS. 2 and 7). It should also be noted that to set the pulse sequence frequency "f" of the pulse duration modulator 24, the magnitude thereof can alternatively also be set to equal the resonance frequency of the basic natural mode of the gas vibration or pulsation in the combustion chamber. In this way, a considerable intensification of the reaction kinetic controlled self-amplification effect of the combustion chamber pulsation results, which in turn gives rise to a welcome increase of the speed components of the pertaining standing wave field. The latter leads to support of the operating mechanism of the mixture preparation to the extent that it is opposed by the flow-related turbulence of swirl and compression flow components. This finally manifests itself in a welcome reduction of black smoke, as is known to result as a consequence of a good mixing of air/oxygen and vaporized fuel during the combustion phase. To be sure, a precondition for such an adjustment of the pulse sequence frequency "f" (the periodic fuel injection) is that the mechanical resonance frequency of the adjustment member 26 be greater by at least a factor of 1.4 than the resonance frequency of the gas pulsation in the combustion chamber. This is generally applicable, for example, for the large combustion chamber diameter of diesel engines of commercial vehicles.

The resonance signal $U_{rs}$ that is formed by the pulse duration modulator 24, and that pursuant to FIGS. 5-9 comprises a rectangular pulse sequence, undergoes in a pulse shaping stage 29 a rounding or flattening not only of the rising but also decreasing sides or amplitudes of the individual rectangular pulses. The purpose of such a processing, together with a suppression of frequency components of the solenoid current determining control signal that are equal to or greater than 0.707 times the lowest resonance frequency "f" of the adjustment member 26, is to reliably preclude the undesired release of natural modes of the adjustment member. The flattening of the respective rising side of the rectangular pulse of the control voltage must follow the equation $0.5 \cdot A_0 \cdot (1 - \cos 2\pi \cdot ft)$, while the flattening of the respective decreasing side of the rectangular pulse must follow the expression $0.5 \cdot A_0 (1 + \cos 2\pi \cdot ft)$: see FIG. 7. In this connection, the equation $$0 < t < \frac{1}{2f}$$

applies, wherein "f", pursuant to the aforementioned requirement, must be the same or less than 0.707 times the adjustment member resonance frequency $f_0$ if $A_0$ represents the intended displacement of the adjustment member Less exacting pulse shaping stages are known in embodiments such as used in a known manner in high amperage pulse methods via critically dampened or attenuated RLC networks (or combinations thereof). Where greater requirements are made on the trueness of the curve of the side flattening, the example of a different hardware approach in conjunction with FIG. 3 is considered.

Figure 3:
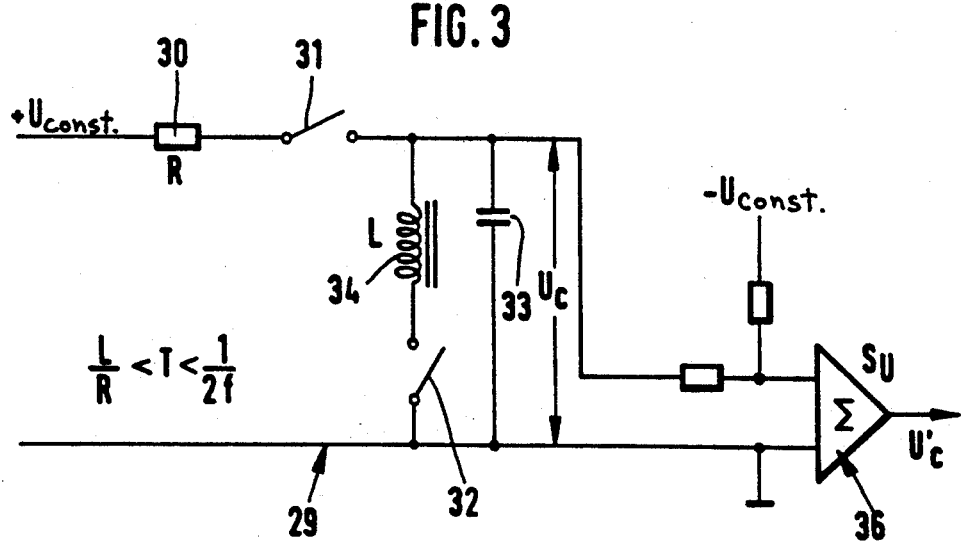
FIG. 3 shows an electronic circuitry with a constant frequency generator for controlling the solenoid of the adjustment member for an injector having an expanding wedge-type bearing means.

The embodiment of FIG. 3 essentially relates to a low-loss or attenuation LC network that is supplied via a compensating resistor 30 from a positive constant voltage $+U_{const}$. With the aid of electronic switches 31 and 32, charge reversal processes of a capacitor 33 are initiated, a consequence of which are such time function of the voltage $U_c$ across the capacitor 33 that from this the two trigonometric theorems (1±cos 2π·ft) that determine the side deformation are easily derived.

The pulses required for controlling the switches 31 and 32 can be generated as follows. From the signal pattern (FIG. 3a) that is represented by the voltage $U_{RS}$ and that is available at the output of the pulse duration modulator 24 (FIG. 2), a monoflop function having the pulse duration $$\frac{1}{2f}$$

and the output voltage $U_{AS}$ is pulsed (FIG. 3c) from the rise and drop of the sides or amplitude of the rectangular pulse with the purpose of closing the switch 32, with this monoflop function being obtainable at the output of an "or" gate, the input side of which in turn is supplied with the output signals of two monoflops (each being controlled with regard to the rising and dropping sides by the signal pattern of FIG. 3a) having the pulse duration $$\frac{1}{2f}$$

(FIG. 3c). The first monoflop, which is triggered at the time of the side or amplitude increase of the resonance signal $U_{RS}$, is disposed at the non-inverting output of a Schmitt trigger, which is supplied directly from $U_{RS}$. In contrast, the second monoflop, which is triggered by the amplitude drop of $U_{RS}$ (FIG. 2), is supplied from the inverting output of the aforementioned Schmitt trigger. At the same time, derived exclusively from the amplitude drop of $U_{RS}$, a third monoflop having the pulse duration $$\frac{1}{2f} + \tau$$

is triggered (FIG. 3b), from the output voltage UV of which, with the closure pulse voltage $U_{AS}$ subtracted via a subtractor, and second control pulse voltage $U_{NL}$ (available at the output of the subtractor) having a duration $\tau$ results that in turn briefly closes the switch 31.

If at the point in time $T_0$ (see reference numeral 27 in FIG. 2) a further monoflop (which preliminarily comes into action one time for each new cycle) is excited by a zero crossing unit 39 (FIG. 2) for the duration $\tau'$, and at the same time is "or" gated with the closure pulses $U_{AS}$ (excitation of switch 32, FIG. 3) to act upon the switch 32 to close the same, the correct polarity voltage conditioning of the capacitor 33 required prior to the start of the cycle is ensured.

In such a biased state of the capacitor 33, the closing of the switch 32 at the time point $T_1$ (marks the beginning of the cycle relevant injection process with the amplitude increase of the first modulation pulse) initiates the discharge of the capacitor 33 via a charge reversal inductor 34. If the relationship of the capacitor 33 and charge reversal inductor 34 satisfies the equation for electrical resonance frequency $$f = \frac{1}{2\pi\sqrt{L \cdot C}} < 0.707 f0$$

(with f0 being equal to the resonance frequency of the adjustment member), the capacitor voltage within the time interval $$T_1 - T_2 = \frac{1}{2f}$$

proceeds in the manner illustrated in FIG. 3d. The capacitor 33 is now at the voltage level $U_c$ until the time point $T_3$ is reached. At that point, the switch 32 again initiates a closure process that is followed by a corresponding charge reversal of the capacitor 33 until the time point $T_4$ is reached. Immediately thereafter the switch 31 is closed for the time duration $\tau$ (switch 32 is opened!) to correct the slight voltage reduction $U_c$ caused by the active power loss in the resident circuit 33, 34. So that this "additional charge process" during the time frame $T_4$-$T_5$ is as short as possible, the condition $$\frac{L}{R} < \frac{1}{2f}$$

should be fulfilled.

Figure 4:
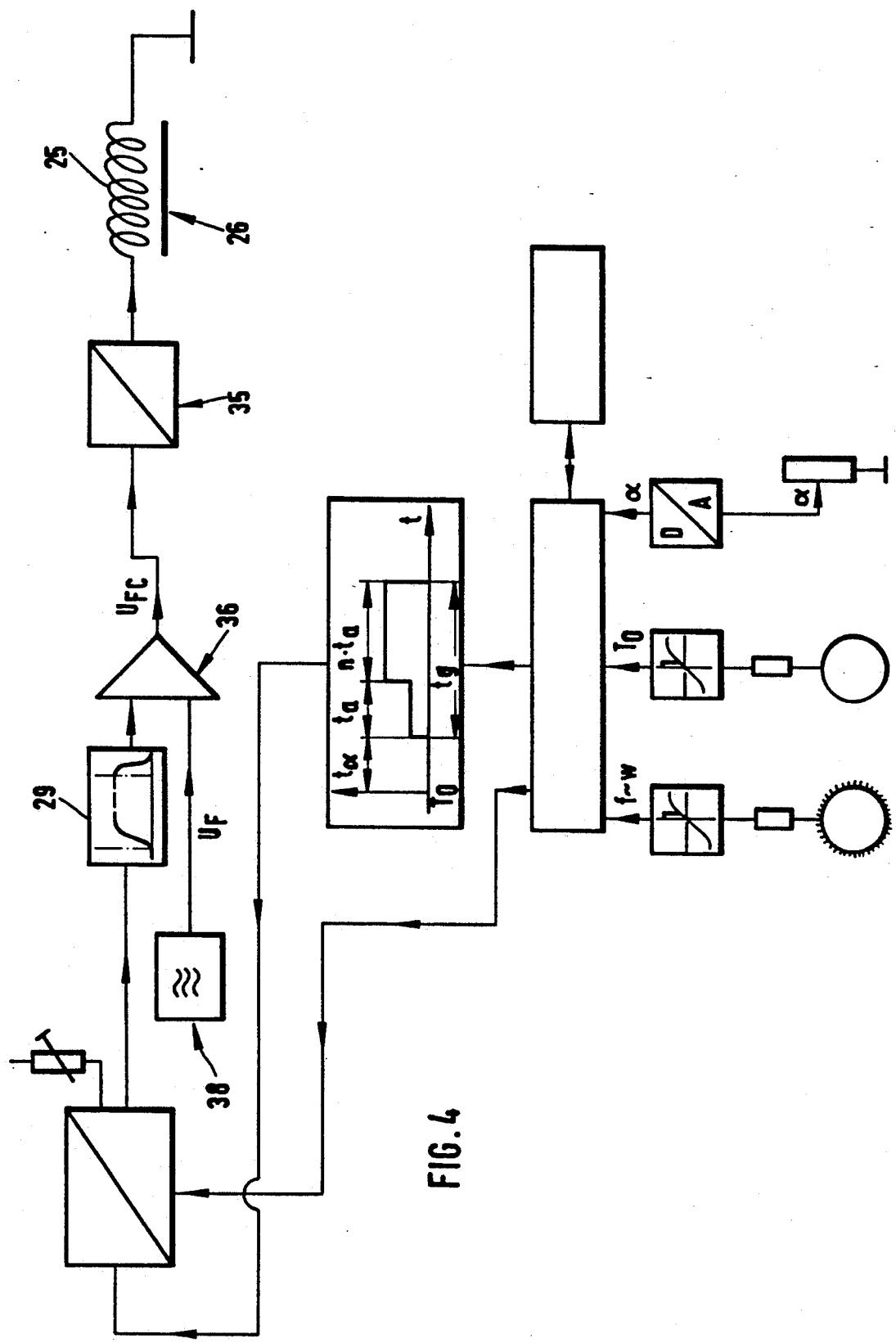
FIG. 4 shows the electronic circuitry of FIG. 2 with the constant frequency generator of FIG. 3.

To convert the capacitor voltage $U_c$ (see FIG. 3d) into the form of FIG. 3c, $U_c$ is to be after-treated with an inverting summing amplifier 36 (FIG. 3), the second summing input of which is constantly supplied with the voltage $-U_{const.}$. The control signal pattern $U'_c$ obtained at the summing output is now suitable as a theoretical value for driving a voltage/current converter 35 (FIG. 2), if first, however, with the aid of a non-inverting summing amplifier 36 (FIG. 4) overlapping with a "forming signal" of a self adapting expanding wedge-type bearing means 87 (FIG. 14) occurs. As shown in FIG. 4, the forming signal is derived from a harmonic constant frequency generator 38, and conforms to the equation UF=UFO·sin (2π·ft), whereby "f" should be equal to or greater than the inherent frequency of the axially embodied base natural mode of a ferromagnetic rod (as a component of the adjustment member 26). $U_f$ should trigger such an excitation H of the hydraulically biased ferromagnetic rod that the alternating-current amplitude of the adjustment member generated thereby is very small ($\leq 1\mu$ m). In cooperation with a sufficiently large forming signal frequency, a periodic opening of the contacts at the wedge support surfaces results, thus suppressing the static friction relative to radial shifting movements of the expanding wedges of the expanding wedge-type bearing means 87 (FIG. 14).

The signals $U_C$ and $U_F$ that are additively mixed in the manner described above produce at the output of the summing amplifier 36 the new voltage $U_{FC}$, which in the voltage/current converter 35 undergoes a conversion into a proportional solenoid energizing current $J_{SS}$. This conversion into an impressed current $J_{SS}$ is necessary in order to be able to preclude reactions of magneto elastic effects in the ferromagnetic adjustment rod of the adjustment member 26 upon the inductance of the solenoid 25 and hence the excitation current $J_{SS}$ itself. Variations of the injection progress, which is controlled by the electronic circuitry, can be seen from FIGS. 5-9.

Figure 5:
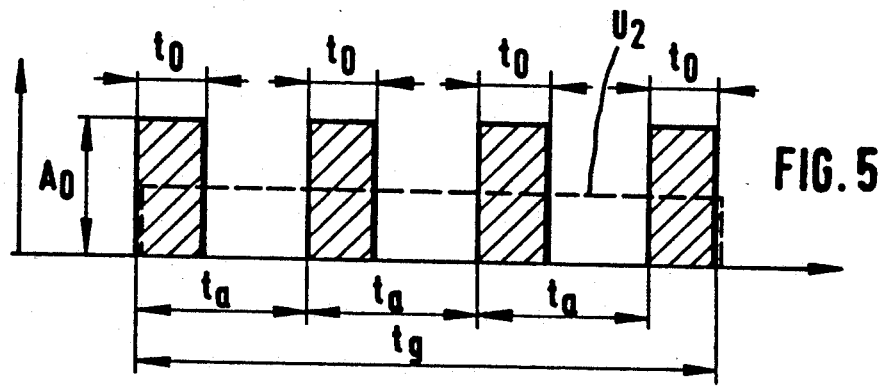

FIG. 5 shows the dependence on time of an opening cross-sectional area $A_0$ and the input voltage $U_2$ of the pulse duration modulator 24 (FIG. 2). In this connection, an overall injection duration $t_g$ is subdivided by monochrome cycling into a series of shorter portions having a constant opening cross-sectional area, each having an opening duration $t_0$. The pulse interval is $t_a$. The ratio of the opening duration $t_0$ to the pulse duration $t_a$ is thereby constant.

Figure 6:
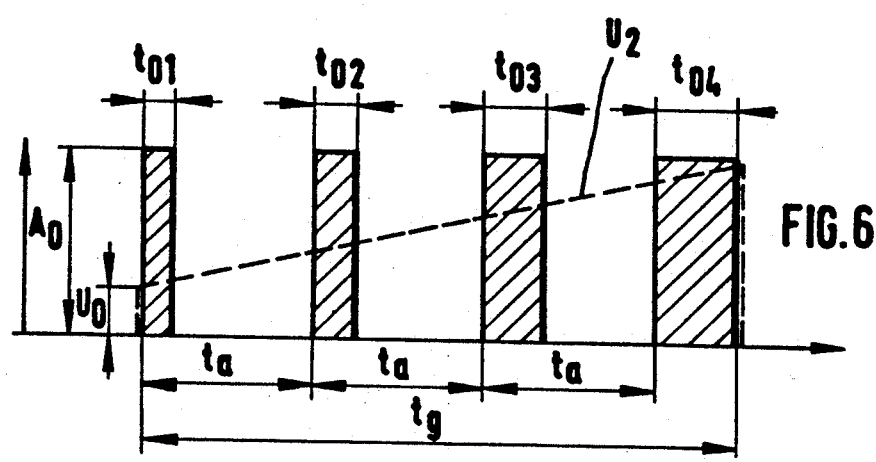

FIG. 6 illustrates operation of the opening cross-sectional area $A_0$ and the input voltage $U_2$ of the pulse duration modulator 24 (FIG. 2), with the opening times $t_{01}$ to $t_{04}$ of the individual pulses increasing in proportion to the time t.

Figure 7:
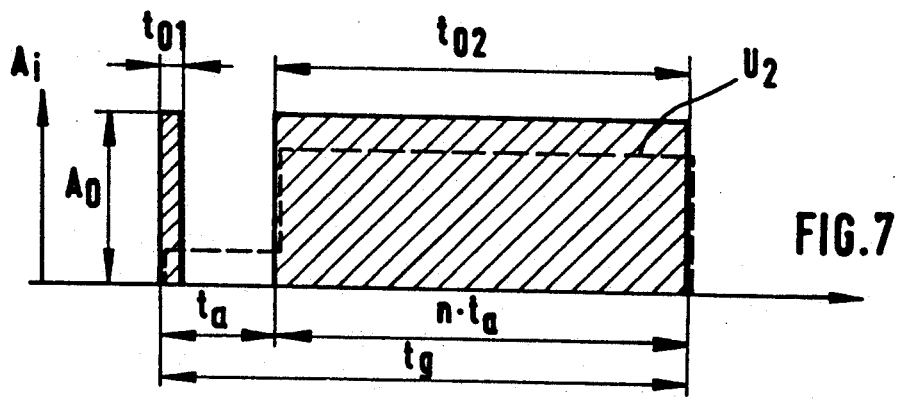

A pilot injection followed by a main injection is shown in FIG. 7. The overall injection duration $t_g$ is divided into two portions. The first portion having the opening duration $t_{01}$ represents the pilot injection, that is followed after the interval $t_a$ by the main injection, which has a duration $t_{02}$.

Figure 8:
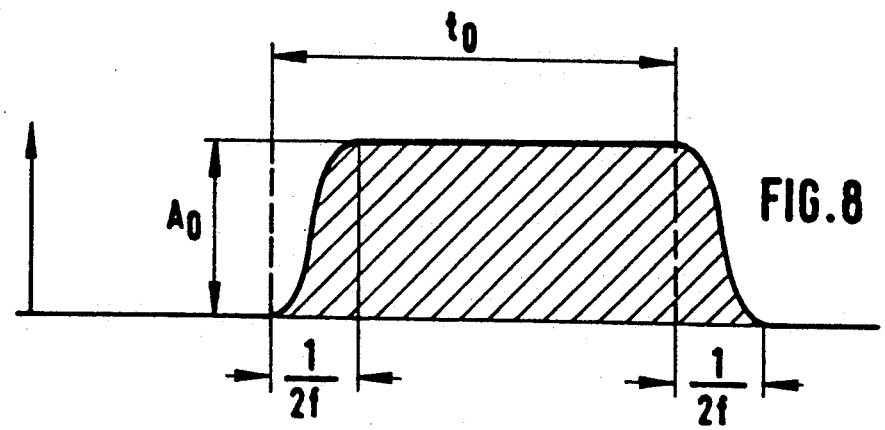

As shown in FIG. 8, the rising and dropping sides or amplitudes of the rectangular pulses of FIGS. 5-7 conform to a harmonic curve according to the equation $A=0.5 \cdot A0 \cdot (1-\cos 2\pi \cdot ft)$ for the rising amplitude and according to the equation $A=0.5 \cdot A0 \cdot (\cos 2\pi \cdot ft+1)$ for the dropping amplitude for the time span defined by $$0 < t < \frac{1}{2f},$$

with $A_0$ representing the largest opening cross-sectional area of the adjustment member 26 (FIGS. 2 and 4), and the frequency "f" being smaller by at least a factor 0.707 than the mechanical resonance frequency of the adjustment member 26.

Figure 9:
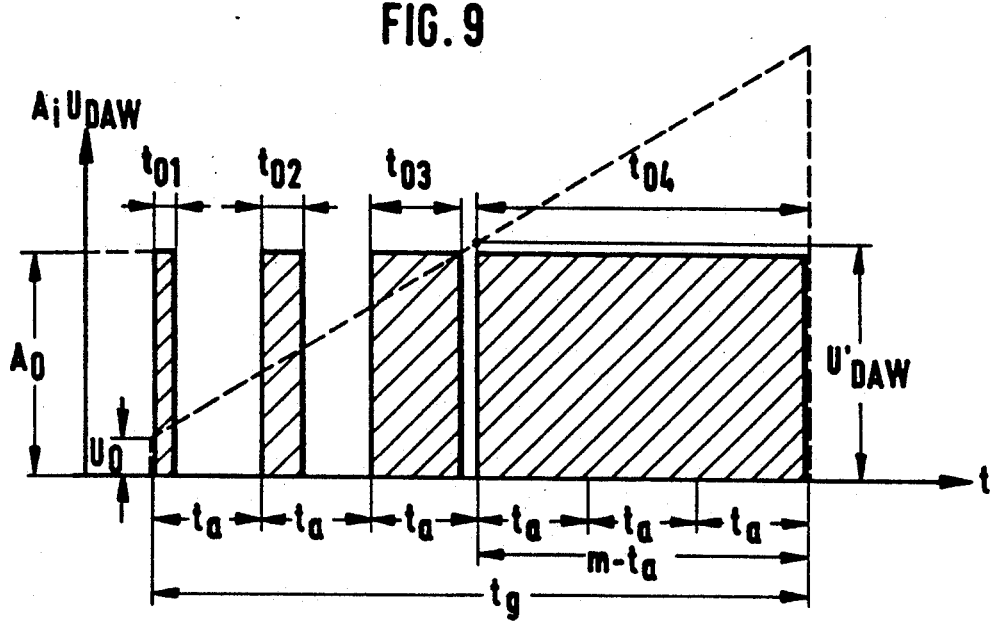
FIGS. 5-9 show variations of the chronological modulation for the movement progress of the adjustment member.

As shown in FIG. 9, the chronological progress of the ratio of the opening duration $t_0$ to the pulse interval $t_a$ follows a straight line, the slope of which is such that even prior to conclusion of the overall injection duration $t_g$, the ration $$\frac{t_0}{t_a},$$

has reached the value 1.

Exemplary embodiments of injection valves for carrying out the inventive method are illustrated in FIGS. 10-17. The injection valve represents a critical component of the invention.

In conformity with their operating principle, the valves comprise the two main components of a housing and adjustment member, with the housing being made of austenitic material.

Figure 10:
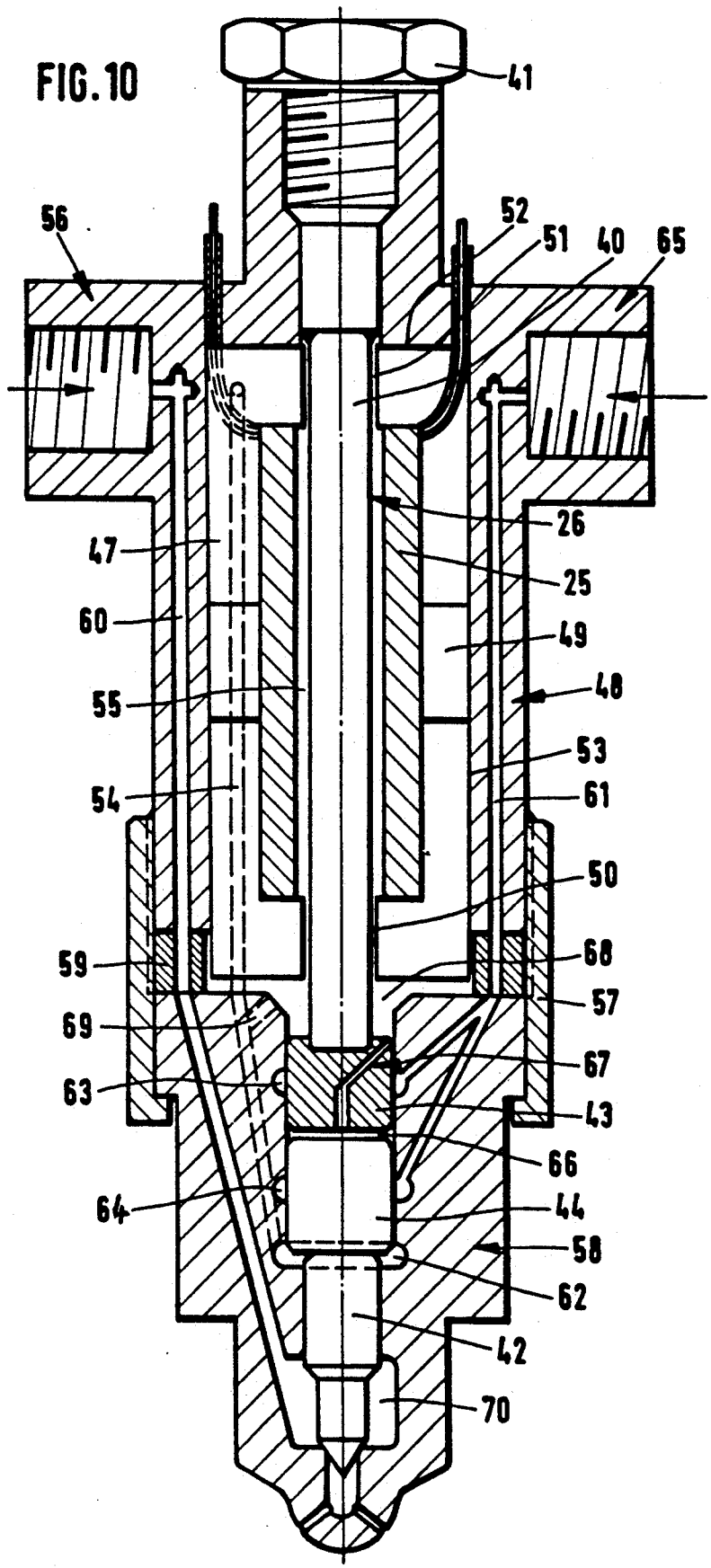
FIG. 10 is a cross-sectional view through one exemplary embodiment of an injector having a solenoid and a ferromagnetic rod as an adjustment member.

FIG. 10 shows an injection valve where the adjustment member 26 is controlled by the magnetic force of the solenoid 25.

The adjustment member 26 comprises a ferromagnetic rod 40 that is positively connected to a bolt 41 by being welded thereto. However a positive welding connection can be eliminated in those cases in which the hydraulic displacement force (start of opening of the valve) that acts upon an injector needle valve 42 is reliably adequate to always exceed the sum (determined by time gradients of the desired opening speed of the rod 40) of the inertia forces as they are based on the individual masses (injector needle valve 42, pistons 43, 44, rod 40) that are to be accelerated. In addition, as an alternative to the weld connection, a simple "insertion" of the rod 40 is also conceivable, which however, in a manner similar to the end region of the piston 43, requires a cylindrical recess in the end of the shaft of the bolt 41 in order to be able to also radially guide the upper end of the rod 40. A solenoid 25 of insulated copper wire surrounds the rod 40, from which it is separated by first and second air gaps 50 and 51. The solenoid 25 is seated in a magnetic return or ground means 47 of plated, soft magnetic material having a high permeability and saturation field strength (and positively connected to the injector holder 48 via casting resin). The return means 47 is interrupted by a serially inserted (glued in) permanent magnet 49 that is characterized by a high energy product of approximately 200 $kJ/m^3$ and a similarly high coercive field strength of about 1200 $kA/m^3$. The selection of the length of the magnet is to be coordinated with the magnetic resistance of the magnetic return means 47 and the two air gaps 50 and 51 in such a way that in the magneto strictive adjustment member 26 a field strength of approximately 88 kA/m prevails. In a modified arrangement, it is also conceivable to utilize for the rod 40 a modified alloy of the material that in place of the positive sign of the magneto striction provides a negative sign. In an advantageous manner, the need for a permanent magnet biasing as a means for reducing the resistance losses of the excitation current in the winding of the solenoid 25 is then eliminated. However, this negative magneto striction is achieved at the expense of a loss of the nearly linear relationship between the controlling excitation current and the adjustment distance produced thereby, which, as will be described subsequently, has a consequence with regard to the effort to linearize the control signal generation. The return means 47 is secured via adhesive means to the injector holder 48, and in particular in the vicinity of the spaces 52 and 53. Axial openings in the end region of the injector holder 48 make it possible to lead the two solenoid connector wires out.

In the event of complicated timing functions of the desired injector needle valve movement, one must expect higher frequency components in the winding excitation current. The eddy currents that can then not be avoided and that are produced transformer-like in the peripheral region of the theoretic rod St are the cause for the release of heat due to energy losses. In order to withdraw these it may be necessary, counter to the illustration, to convey the leakage line 54 which withdraws the leakage fuel, not through the injector holder 48 but rather through the air gap 50 and subsequently along an annular gap 55 to finally discharge it through an axial bore in the bolt 41 of the valve in the direction of the first connector 56 to the tank. Two axial, diametrically opposed grooves (not illustrated) on the magnetic return means in the region of the air gap 50 ensure in conjunction therewith a low resistance to flow. The tube or hose connection for the leakage fuel can then be integrated without difficulty from the end in the bolt 41, with this connection, in contrast to the illustrated approach, then leaving the injector holder 48 horizontally and radially via a non-illustrated screw coupling.

A threaded collar ring 57 provides a positive connection of an injector body 58 on the injector holder 48. An intermediate ring 59, which is prevented from turning in a circumferential direction, assumes not only a sealing function but also the further axial transmission of the fuel, which is under tank pressure, within the first and second bores 60 and 61 as well as for the removal of the leakage fuel into the leakage line 54.

The vaporizer portion, fuel supply to the injector needle valve 42, as well as the configuration of the injector needle valve 42 correspond in the present pressure release valve to known design points. Care must be taken that the ferromagnetic rod 40 have a sufficient length (its used controllable magneto strictive change in length is approximately 1.6 pars pro mille) in order to keep the undesired throttling effect of the injector needle valve seat (in the opened state!) within appropriate limits. With an optimum dimensioning of the sealing surface geometry of the injector needle valve seat the aforementioned throttling effect can additionally be minimized (the high inlet fuel pressure permits larger mean diameters of the circular sealing surface).

What is novel is the absence of a spring, which determines the sealing force and at the same time the opening pressure, in order to hold the injector needle valve 42 down. The function of such a spring is, pursuant to the present invention, taken care of by a hydraulic auxiliary mechanism that, as a variation of the previous task, serves for a largely hysteresis-free and non-elastic coupling (frictional connection) of the injector needle valve 42 to the movement state of the adjustment member 26.

The essential components of the aforementioned auxiliary device are the two pistons 43 and 44. A leakage fuel collecting leakage groove 62 is provided in the region of the axial force receiving end face of the injector needle valve 42; the leakage line 54 opens out into this leakage groove 62. Further annular grooves 63, 64 are respectively disposed halfway along both the first piston 43 as well as the second piston 44, where they take care of supplying the preliminary control pressure from the pressure chamber 9 (FIG. 1) via a second connector 65.

A capillary bore 67 serves for venting a hydraulic gap 66. Connected to the end of the capillary bore 67 is a further very thin bore (having a diameter of only a few times the sealing gap width of the two pistons 43, 44, namely approximately 8 µm; for this reason, it is a laser bore). The fuel that is released via the aforementioned capillary bore 67 into the "leakage chamber" 68 finally passes from there into the leakage line 54 via a circumferentially offset bore 69. An axial recess at the upper end face of the first piston 43 serves for supporting the ferromagnetic rod 40.

The inventive electromagnetically controlled pressure release valve operates as follows.

A critical component of the overall system is the ferromagnetic rod 40 which, due to its special "magneto mechanical" characteristics, actually for the first time makes possible the desired rapid movement of the injector needle valve. This latter capability is due to the ability of the adjustment member 26 to extend under the influence of a magnetic field and to again reverse this extension when this same field is terminated. Material characteristics of this type are known by the term "magneto striction" and are made use of, for example, with needle printers and ultrasound generators. However, the adjustment member material utilized in the present case (an alloy of iron, terbium, and dysprosium having a preferred crystallin structure), is characterized by a particularly high magneto striction, i.e. beginning of movement per unit of impressed magnetic induction. At 1.6 pars pro mille increase in length at maximum induction, it is a multiple of what up till now has been known for commercial materials that have at their disposal magneto strictive and electro strictive properties. Perhaps further alloys will be developed having similarly high magneto striction with an even more favorable price to output ratio.

The alternating action of the hydraulic coupling system with the magnetic adjustment member 26 will be briefly explained in consideration of the chronological progress of an injection process including what precedes it.

In the closed state of the injector needle valve 42, the solenoid 25 is initially deenergized, so that the magnetic return means 47, including the rod 40, has its maximum magnetic modulation, originating from the permanent magnet 49. In this time slot the rod 40 is in the state of its greatest extension in length (in this connection it also becomes clear that to avoid a magnetic shunt path, the injector holder 48 should be made of a nonmagnetizable material, with this however being applicable only as long as the radial spacing of the magnetic return means 47 from the inner wall of the injector holder 48 is equal to or less than the radial width of the gaps 50 and 51; ferromagnetic material for the injector holder 48 is thus permissible if the magnetic return means is spaced adequately far from the injector holder 48 and if the axial spacing of the return means 47 relative to the injector holder in the zone of the leakage chamber 68 similarly satisfies this condition). Via the second bore 61, the annular grooves 63 and 64 are supplied with pressure from the second pressure chamber 9 (FIG. 1), which leads to leakage streams in the sealing gaps of the pistons 43 and 44 as well as of the capillary bore 67. The leakage chamber 68, the leakage groove 62 and the hydraulic gap 66 provide collection areas for these leakages. The leakage stream that passes the sealing gap of the injector needle valve shaft is collected by the leakage groove 62 and is withdrawn via the leakage line 54 In a similar fashion, the leakage of the leakage chamber 68 is withdrawn, and in particular via the bore 69 and the leakage line 54.

In the gap 66, such a pressure builds up that due to the very small pressure drop of the two leakage streams that flow into the gap 66, which pressure drop builds up in the sealing gaps of the two pistons 43 and 44, this pressure is insignificantly less than the pressure originating in the pressure chamber 9. A requirement for this is that the two aforementioned leakage flows in the capillary bore 67 develop a very high pressure drop, which is easy to ensure via the selection of the very small bore diameter of approximately 8 µm. A clogging of this bore during operation is precluded since the narrow sealing gap of the pistons 43 and 44 as well as a particle filter disposed upstream work in favor of the capillary bore 67.

The previously mentioned pressure in the gap 66 displaces the two pistons 43, 44 into their respective end positions, which for the piston 43 is provided by the end face of the rod 40, and for the piston 44 is provided by the end of the shaft of the injector needle valve 42. The axial force that acts upon the shaft of the injector needle valve 42 during the closing phase thus results as a difference between two hydraulically generated forces. This involves, on the one hand, the opening force derived as a product formed by the pressure of the pressure chamber 5 and the axially oriented hydraulic effective surface of the injector needle valve 42 in the pressure chamber 70, with this effective surface being accessible to the pressure of the pressure chamber 5, and on the other hand from the closure force, similarly the product of the pressure in the hydraulic gap 66 (identical to the pressure in the second pressure chamber 9) and the hydraulic effective surface of the second piston 44 in conformity with the diameter thereof.

If by raising the injector needle valve 42 the atomizing or vaporizing of fuel is to be initiated, this is effected as follows.

By applying current to the solenoid 25, the permanent magnetic magnetization is to a large extent eliminated, which results in a shortening of the rod 40 to a length that corresponds to the desired opening position of the injector needle valve. As a consequence of the low filling speed of the hydraulic gap 66, the injector needle valve 42, including the two subsequently arranged pistons 43, 44, under the influence of the pressure in the pressure chamber 70 of the injector needle valve 42, follow the shortening of the rod 40 practically without delay. If the injector needle valve 42 remains in the raised state (injection duration) for a longer period of time, then due to the limited leakage quantity that passes through the sealing gaps of the two pistons 43 and 44, an unavoidable axial growth of the gap 66 occurs, which is followed by a similar movement not only of the piston 44 but also of the injector needle valve 42, so that the gap formed between the tip of the injector needle valve and the associated seat again increases slowly. In order to minimize this effect from a design standpoint, the leakage rate of the piston sealing gaps should be kept as small as possible, for example by minimizing the gap width of the latter. The leakage quantity can also be kept small by lengthening the pistons 43 and 44. Particularly effective is a method that will be described in detail subsequently and that with the aid of a special control of the magnetic flux, for example via a rapid energizing and deenergizing thereof, counteracts a constant correction of the aforementioned gap growth, which is also significant for ensuring the so-called uniform supply of all of the participating pressure release valves (in conformity with the number of cylinders of the engine). This uniform supply is endangered if the individual leakage quantities of the pistons 43 and 44 in all of the pressure release valves are different (due to the different sealing gap tolerances thereof), which is the expectation in practice.

That a continuing minimum increase of the gap 66 (during raising of the injector needle valve) is even desired, is shown by observing the cycle of operation of the lowering of the injector needle valve, i.e. the conclusion of the injection process. This lowering is initiated as a consequence of the electrical excitation of the solenoid 25. In so doing, the rod 40 undergoes an extension and via the component sequence piston 43, hydraulic gap 66, piston 44 brings about the lowering of the injector needle valve 42. Due to the slight axial expansion of the gap 66 that has occurred in the meantime, the injector needle valve finishes lowering before the rod 40 has reached its final length. With the remaining reserve spring force that is thus still inherent to the rod 40, the latter presses the cone of the injector needle valve 42 into the associated seat with a greater than normal force until the aforementioned axial growth of the gap 66 is again completely reversed. This condition is desired to the extent that this means an extremely rapid conclusion of the injection process, which experience has shown to contribute to minimizing hydrocarbon emissions in engine exhaust.

It should also be noted that the volume of the gap 66, i.e. the axial extension thereof, should finally be kept as small as possible with the view toward the desired "hydraulic stiffness". Its dimensions result from the objective of on the one hand compensating for the unavoidable, various thermally-related extensions of the rod 40 and injector holder 4B as well as on the other hand to take into account the undesired striking process of the injector needle valve 42 (permanent deformation!).

An alternative embodiment of the hydraulic connection between the injector needle valve 42 and the rod 40 is shown in FIG. 11. Shown are merely those components that are disposed in the immediate area of the modification.

The basic concept of the altered coupling is the use of a higher preliminary pressure from the second pressure chamber 9 (FIG. 1) to feed the leakage quantity into the gap 66 via the annular grooves 63 and 64. With the first piston 43 having a diameter equal to the shaft of the injector needle valve 42, there results in the movement portion release valve an embodiment that has less mass and is on the whole smaller, accompanied by a lower manufacturing expense. However, the down side of these advantages is that only a slight increase in the operating efficiency of the pressure generator is achieved.

A greater pressure than the means used here to provide the necessary pressure of the tip of the injector needle valve against the associated seat can be achieved pursuant to FIG. 1 in a straight forward manner by suitably increasing the preloading of the valve spring 12 of the relief valve 11. Similarly, as also in the case where two pistons are used, the closure force of the injector needle valve 42 results from the difference of the two oppositely directed forces in conformity with the two products: hydraulic effective surface of the first piston 43 multiplied by the pressure from the second pressure chamber 9 minus the hydraulic effective surface of the seated injector needle valve 42 multiplied by the pressure originating from the first pressure chamber 5 (FIG. 1). Of course, a reliable closing of the valve should also be ensured when the injector needle valve 42 is in the raised state. This is the case (second demensioning condition) when the axial force that originates from the gap 66 and acts upon the first piston 43 is greater than the force that acts upon the injector needle valve 42 and that is the product of the hydraulic effective surface of the raised injector needle valve 42 multiplied by the pressure originating from the first pressure chamber 5.

The operating principle, i.e. the control of the raising and lowering process of the injector needle valve, takes place in the same way as previously described with the two auxiliary piston version of FIG. 10, namely by energizing or deenergizing the solenoid 25 (FIG. 10) that generates the magnetic field; thus, no further explanation is required.

By consistently pursuing a minimizing of the manufacturing cost, it is advisable to deliver those components of the leakage fuel that originate from the first piston 43 and flow off against atmospheric pressure (fuel tank) through the annular gap 55. From there, the leakage fuel can be conveyed via an axial hole through the bolt 41 (FIG. 10) to the tube connection provided there. A different situation exists for the remaining partial leakage stream of the piston of the injector needle valve 42, which must move against the pressure of the first pressure chamber 5 that exists at the first bore 60. Due to the lower pressure in the pressure chamber 70 (compared with the pressure in the hydraulic gap 66), the leakage fuel, while passing the pressure chamber 70 and the fuel-supplying first bore 60, passes into the first pressure chamber 5 (for the duration of the rest position of the injector needle valve).

Figure 12:
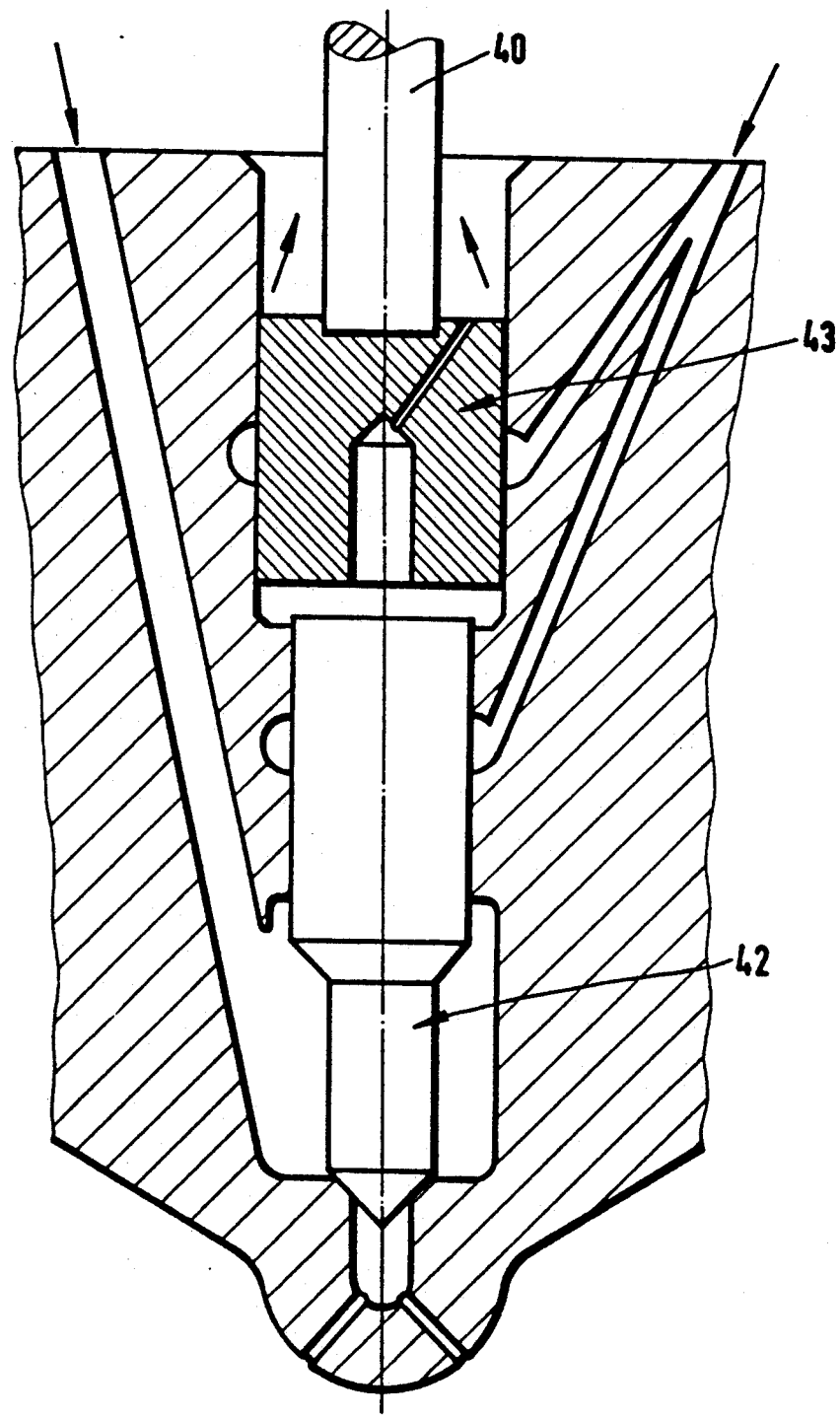
FIG. 12 is a cross-sectional view of an injector where the injector needle valve is embodied as a piston of smaller diameter as a displacement amplifier.

A further modified version of the embodiment of FIG. 11 is shown in FIG. 12. The idea here is to convert the relatively small adjusting path of the rod 40 (approximately 0.16 mm for a magnetic active rod length of 100 mm) into a greater stroke or travel path of the injector needle valve 42 (approximately 0.4 mm). This is possible by making the diameter of the first piston 43 greater than the diameter of the injector needle valve 42, which is embodied as a piston. For the aforementioned example of the hydraulic "path gain", assuming a shaft diameter of the piston of the injector needle valve 42 of 6 mm, a diameter of the first piston 43 of approximately 10 mm is required.

Figure 13:
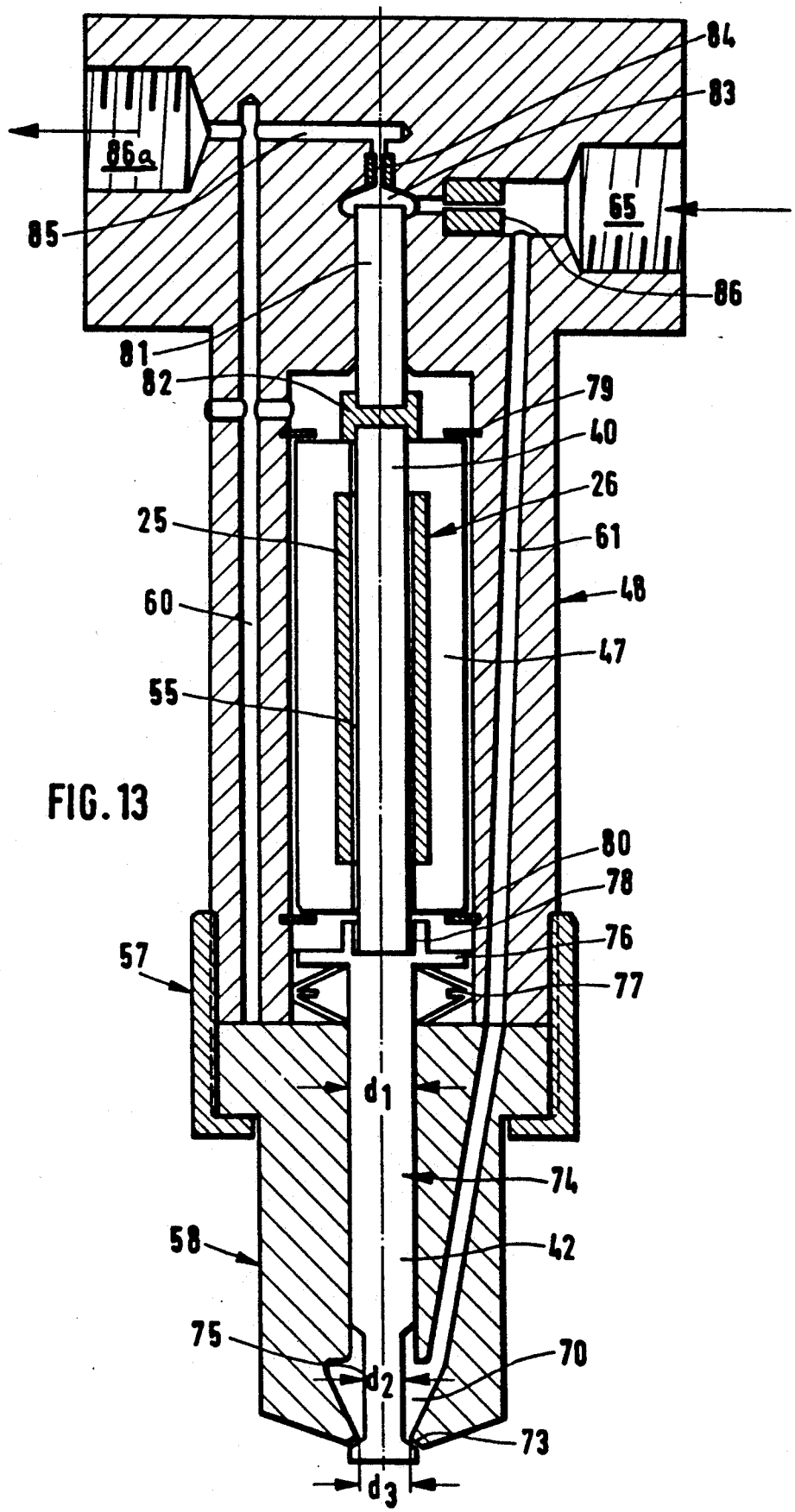
FIG. 13 shows an injector having a seat gap jet.

A further modification of the pressure release valve is shown in FIG. 13. The concept that determines the structural configuration of this device proceeds from a so-called "seat gap injector", the needle valve opening and closing movements of which, in comparison to the previously described injector embodiments, take place in the opposite directions. This permits the use of positive magneto strictive material for the adjustment member 26 and the elimination of the permanent magnet 49 (FIG. 10) that must otherwise be serially inserted into the magnetizing path in order to provide for the premagnetizing.

In addition, by suitably geometrically designing the valve seat 73 and the injector needle valve 42 in a desired manner, it is possible to establish the sign of the hydraulic axial force of a shaft 74 of the injector needle valve, which axial force proceeds from the pressure chamber 70 near the injector, and to also establish the magnitude within relatively wide ranges.

The degree of freedom of this design parameter gained thereby is welcome at the latest if the concern is the dimensioning of the valve seat pressure and closing time with their divergent force requirements (optimum seating pressure requires relatively little axial force; a valve closure time that is as short as possible requires a large axial force).

At the same time, this type of valve permits a partial compensation of the high fuel pressure, which leads to a reduction of the axial forces in tho shaft 74 of the injector needle valve to an order of magnitude that is determined by the aforementioned requirements of the seating pressure and the closure time. Together with the advantageous injector characteristic, even where the injector is raised only very little, of releasing a large injection cross-sectional area, the reduced displacement force expenditure means a considerably smaller dimensioned adjustment member 26 (smaller cross-section and hence more compact unit), as well as the elimination of hydraulic movement reinforcers, which means a more economical system. Similarly contributing to the reduction in complexity and hence cost is the elimination of the second pressure chamber 9 (FIG. 1), the function of which is no longer needed. Of great significance with regard to being able to have an influence is the ability of the injectors to alter the cross section of the stream as a function of the stroke or travel of the shaft 74 of the injector needle valve.

Prior to a detailed description of the operation, a short explanation of the individual structural elements is provided.

Two components, namely the injector holder 48 and the injector body 58, are fastened to one another via the threaded collar ring 57 and represent as this unit the housing element of the pressure valve. The injector needle valve shaft 74, which has the diameter $d_1$, is disposed in the injector body 58 in such a way as to be axially displaceable. The bottom end of the shaft 74 is provided with a peripherally parallel recess 75 to form a tapered portion having the diameter $d_2$. The pressure chamber 70 results from the recess 75 together with a further circumferential recess provided radially across therefrom in the injector body 58; pressure is supplied to the pressure chamber 70 via the second bore 61. The lower end of the injector body 58 forms a valve seat having an inner diameter $d_3$. Together with the headlike end of the injector needle valve shaft 74, which similarly has a conical seating function, a sealing surface results that assumes the hydraulic switching function and that upon opening of the seat, controls the vaporizing process at the outer periphery (facing the combustion chamber of non-illustrated cylinder) of the resulting seating gap as a function of the stroke or travel of the shaft 74.

That end of the injector needle valve shaft 74 that is remote from the vaporizing jet is provided with a collar 76 that serves as an abutment for a cup spring pair 77. A coaxially disposed recessed portion 78 in the form of a blind hole in the end face of the shaft 74 serves not only as a radial guidance for the adjustment member 26 but also provides an axial support therefor. However, as described previously, the magneto strictive rod 40 is surrounded by a laminated, magnetic return means 47 that is excited by a solenoid 25 when it is supplied with power. The return means 47 is fixed in the axial direction in the injector holder 48 via two retaining rings 79, 80. The electrical line connection of the solenoid 25, as well as the means for guiding the same through the housing, has been eliminated in the drawing to facilitate illustration.

An axially displaceable auxiliary piston 81 is frictionally connected via a spacer 82 with the residual end of the rod 40, with the other end of the piston 81 extending into a damping chamber 83. Via a venting bore 84, pressure equalization is effected to a passage 85, which in turn communicates with the first bore 60 (for leakage fuel originating from the annular gap 55 of the magnetic return means 47) and opens into the third connector 86a, which functions as a leakage withdrawal means. The pressure supply for the damping chamber 83 is effected from the second connector 65 via a restrictor 86, whereby the connector 65 communicates with the first pressure chamber 5. Similarly, the second bore 61 branches off from the connector 65 and functions as a feed line to the pressure chamber 70.

The manner of operation is as follows. With the aid of the weak cup spring pair 77, on the one hand the injector needle valve shaft 74 is prevented from opening the value gap (due to its weight) and at the same time via excess force the spring pair 77 must overcome the oppositely directed pressure of the auxiliary piston 81 originating from the pressure within the damping chamber 83 to reliably keep the sealing gap of the valve seat closed. This last-mentioned function is significant during the charging phase of the first pressure chamber 5 (start-up process after a longer downtime) in order to preclude an uncontrolled passage of fuel into the combustion chamber.

However, the actual closing force generation, during normal operation of the engine, results from the effect of the fuel pressure in the pressure chamber 70; thus, ultimately from the pressure in the first pressure chamber 5. In conformity with the difference between the two hydraulic effective surfaces of the injector needle valve shaft 74 in the vicinity of the recess 75, a suitable dimensioning results in an axial excess force in the shaft 74 that leads to the reliable sealing relative to the high fuel pressure.

The aforementioned hydraulic effective surfaces are circular surfaces, with the surface that acts in a closing sense being defined by the diameter difference $d_1-d_2$, whereas the surface that acts in an opening sense being defined by the diameter difference $d_3-d_2$.

As described in conjunction with the previous versions, a dynamically operating hydraulic bearing or abutment means serves to compensate for various (temperature-related) expansions of the injector holder 48 plus the injector body 58 and the adjustment member 26. Whereas previously the compensation movement was connected with the function of a hydraulic coupling gap so that the active end of the adjustment member 26 was frictionally connected with the injector needle valve shaft 74 (while the inactive end of the adjustment member was positively or frictionally supported at the upper end of the injector holder 48), this time the inactive end of the adjustment member is part of the compensation action. The aforementioned inactive end of the adjustment member 26 is supported via the spacer 82 against the auxiliary piston 81, which in turn extends into the damping chamber 83 and, from the pressure that prevails there, receives an impressed axial force that acts in a direction for opening the valve. The magnitude of the pressure in the damping chamber 83 is a function of the relationship of the bore diameter of the venting bore 84 and of the restrictor 86. In order to keep the pressure of the damping chamber 83 low, the flow resistance of the restrictor 86 should be great in comparison to the value resulting from the parallel connection of the flow resistances as well as the sealing gap of the auxiliary piston 81 and the venting bore 84 of the damping chamber 83. The diameter of the venting bore 84 should be as small as possible in order to avoid unnecessary leakages. The initiation of the injection process is effected in the usual manner by magnetically exciting the solenoid 25. The resulting extension of the adjustment member 26, which is made of positive magneto strictive material, is transmitted, accompanied by overcoming not only the spring force of the cup spring pair 77 as well as the hydraulic closing force (resulting from the pressure in the chamber 70) to the injector needle valve shaft 74, which in turn releases the fuel flow by opening the valve gap. The micromovement of the auxiliary piston 81, which cannot be avoided for the duration of the fuel injection and which results from the resilience of the hydraulic abutment means and is essentially determined by the leakage in the sealing gap of the auxiliary piston 81, leads during the closure process of the valve (counter to the force of the adjustment member 26) to a brief and not necessarily unwelcome increase of the valve closure force, and in particular until the steady-state or inertial equilibrium state for the rest phase of the valve is produced by the hydraulic abutment means in the force-transmitting path (series connection of injector needle valve shaft 74, rod 40). Again, an arrangement exists that permits a release of the injection process in a high-frequency sequence of closing and opening movements (periodic modulation of the fuel vaporization with a view toward optimizing the so-called fuel injection principle). A resulting undesired resonance state can be reliably precluded if the excitation frequency of the adjustment member 26 is selected so as to remain below the lowest inherent frequency (axial and bending modes) of the components that form the force path and are connected in series.

If the undesired fuel leakage of the hydraulic abutment means formed from the auxiliary piston 81 is to be avoided, an alternative approach would be to use an abutment means that operates exclusively on a mechanical principle.

The construction and manner of operation of such a mechanical means is illustrated in FIGS. 14 to 16. The components necessary for realizing the hydraulic abutment means, such as the passage 85, the venting bore 84, and the restrictor 86, can be eliminated in this embodiment.

The spacer 82 that forms the previous connecting end of the upper end of the adjustment member 26 is now replaced by a component that will be designated as an expanding wedge-type bearing means 87 that in the lower portion, via a blind hole-like recess 88, provides for a radial restraint of the rod 40 of the inactive end of the adjustment member.

The outer periphery of an axially displaceable housing 89 has a second recess 90, which is similarly in the form of a blind hole in order to also there ensure the radial guidance of the rod 40 of the adjustment member 26. Within the recess 88 of the expanding wedge-type bearing means 87, at that end face that is remote from the adjustment member 26, two wedge-shaped parts, namely a first part 91 and a second part 92 which are movable relative to one another in a radial direction, are loosely disposed one above the other in such a way that their angled surfaces contact one another, with said angle being indicated by the reference symbol $\phi$. Two similarly radially acting springs 93 and 94 serve not only as abutment means but at the same time also as restraining force delivery means. Similarly loosely inserted segment pieces 95 and 96 (FIG. 15) provide for a lateral guidance of the two wedge-shaped parts.

The manner of operation of this "self adjusting expanding wedge-type bearing means" will first be explained for the non-active state of the valve (closed!). The closure force that is impressed to the injector needle valve shaft 74 (FIG. 13) from the cup spring pair 77 as well as the pressure chamber 70 provides for a closing of the valve gap, as described above. If pursuant to FIG. 13 the solenoid 25 is now impressed during the closed phase of the valve via a free running constant frequency generator 38 (FIG. 4) with a high frequency current pulse sequence (forming signal), the ends of the adjustment member 26 (FIG. 13) execute equal frequency, counter phase longitudinal oscillations to the center of gravity of the adjustment member 26. That end of the adjustment member that faces the expanding wedge-type bearing means 87 thus opens the contact between the elements the housing 89, the wedge-shaped parts 91, 92, and the injector holder 48 of the force path in a high-frequency intermittent manner, so that the radially operating springs 93, 94 have the opportunity in the respective short opening time to move the two wedge-shaped parts 91 92 in extremely short distances in a radial direction, i.e. toward one another (axial length of the bearing means increases).

On the other hand, during the expansion phases brought about by the forming signal, the adjustment member 26 again develops pressure forces (caused by the inertia of the adjustment member 26) that axially act upon the bearing means in the opposite direction (compared with the respective preceding instance of the contact opening). These pressure force pulses are experienced at the contact locations of the two wedge-shaped parts 91, 92 that are inclined at the angle $\phi$ as a force resolution resulting in a radial pair of forces that try to shift the two wedge-shaped parts 91, 92 in such a way that they want to separate from one another, to the extent that the forces of the springs 93 and 94 permit the same. In this way there results an axial resilience of the bearing means again in very short distances, and in particular in the order of magnitude of a fraction of a micrometer. Via a suitable coordination of the spring characteristics of the springs 93 and 94, as well as of the surface inclination angle and also the forming signal dependent travel amplitude of the adjustment member 26, such a "dynamic equilibrium state" of the bearing means is established that the sum of all the gap widths that result between the contact locations (adjustment member 26, housing 89, wedge-shaped parts 91, 92, and injector holder 48) nearly equal the forming signal dependent adjustment member amplitude itself. The latter should be slightly greater than the peak-to-valley height of all of the surfaces that are in frictional contact, that are part of the radial movement components of the equalization process, and move relative to one another.

In order to keep the electrical energy expenditure to the constant "forming" of the bearing means to a minimum, it is expedient to select the mechanical resonance frequency of the force path as a pulse sequence frequency of the "forming current". It should be noted that the theoretical value voltage originating from the free running constant frequency generator 38 (FIG. 4) for the forming current should not serve for the solenoid 25 (FIG. 13) of the magnet path exclusively during the closed state of the valve, but rather it is conceivable that the forming signal be constantly effective (in other words, also during opening of the valve). For the excitation current former already described in FIG. 4, this merely means a superposition of the two theoretical value voltages for the forming and valve opening current in a single summing amplifier 36.

It is easy to see that in addition quasi stationary forces that act upon the expanding wedge-type bearing means, for example as a consequence of thermally-related different expansions between the adjustment member 26, the injector holder 48, and the injector body 58, can similarly be reduced by this system via the automatic change in position of the wedge-shaped parts 91 and 92. Selecting a very small surface inclination angle (static friction of the wedge-shaped parts relative to radial movement forces to the extent that such are brought about by quasi stationary axial forces) ensures that the length equalization process of the bearing means proceeds very slowly, which is much more tolerable in the case of the aforementioned thermally related different expansion between the injector holder 48 and the adjustment member 26 than is a similarly very slow phenomenon.

A further variation of the "rapid pressure release valve" is illustrated in FIG. 17. As was the case with the use of the so-called annular gap injector of FIG. 12, this embodiment also concerns the minimizing of the adjustment force requirement of the injector needle valve 42. In addition to this is the advantage of the possibility of using proven multi-hole jets for vaporizing the fuel. The absence of components such as springs that develop natural modes guarantees the desired suitability for high frequency modulated opening and closing of the injector needle valve 42.

As with the majority of the previously described embodiments, the two housing components injector holder 48 and injector body 58, via the interposition of an intermediate plate 97, are secured together in a pressure tight manner via the threaded collar ring 57. The rod 40, which is longitudinally displaceably movable in the solenoid 25 of the injector holder 48, together with the injector needle valve 42, are embodied in an otherwise conventional manner, yet are characterized by a very small mass. In the vicinity of an injector needle valve pressure shoulder 98, the first bore 60 opens into an annular chamber 99, from which the further transport of fuel to the injector is effected via an annular gap 100. The first bore 60 is connected to the first pressure chamber 5. Details of the upper portion of the valve have been left off since they are identical with the version of the valve illustrated in FIG. 10, so that components having the same functions carry the same reference numerals.

A double piston 101 is in contact with an end face of the injector needle valve shaft 74 and extends in a longitudinally displaceable manner into the lower end of the injector holder 48. The double piston 101 provides for a partial compensation of the hydraulically generated opening force that acts upon the shaft 74. The annular chamber 99 that surrounds the pressure shoulder 98 of the double piston 101 is supplied with pressure from a passage 102 that branches off from the first bore 60. In the vicinity of the end face contact between the ends of the injector needle valve shaft 74 and the double piston 101 is disposed a collecting chamber 103 for receiving leakage fuel. Removal from the collecting chamber 103 is effected via a return passage 104.

That end of the double piston 101 that is remote from the shaft 74 extends into the hydraulic gap 66, to which pressure is supplied via the restrictor 86 from a channel portion that in turn is connected to the second bore 61 that conveys auxiliary pressure.

The second, larger end face that delimits the hydraulic gap 66 is part of the similarly longitudinally displaceable first piston 43, the other end face of which is provided with an axial recess for realizing a radial guidance and at the same time an axial support of the frictionally connected adjustment member (See also FIG. 10). Proceeding from an axial bore 105 that faces the gap 66 in the end face of the first piston 43, a capillary bore provides for the permanent venting of the gap space, as already described in conjunction with FIG. 10. The leakage fuel that emerges in the vicinity of the adjustment member support at the first piston 43 is withdrawn into the return passage 104 via a branch line 106.

The manner of operation of this embodiment is largely identical to the embodiments illustrated in FIGS. 10 and 12. However, to distinguish the improved characteristics, the operating principle will again be briefly described.

In the rest state (valve closed) the adjustment member 26 has its maximum length (with positive magneto strictive material the solenoid 25 is deenergized, the magnetization of the adjustment member 26 proceeds exclusively from the permanent magnet 49 that is serially inserted into the magnetic return means 47; see FIG. 10). That end of the adjustment member 26 remote from the housing support experiences a force impressment that proceeds from the pressure in the gaps 66 via the first piston 43 and in this manner biases the ferritic rod 40 with relatively little force. The gap 66 again fulfills two functions. On the one hand, it equalizes temperature-related different expansions between the adjustment member 26 and the injector holder 48, and on the other hand it realizes the function of increasing the travel stroke by combining two different hydraulic effective surfaces. This increase of the travel stroke, with a desired value of approximately 2.5, would then correspond to a ratio of the diameter of the first piston 43 to the thinner shaft of the double piston 101 of 1.58. The pressure in the gap 66 is established with the bore diameter of the restrictor 86, which provides for a defined volume stream, which is dependent upon the constantly regulated supply pressure from the second pressure chamber 9, to the extent that the flow resistances of the piston sealing gap as well as of the capillary bore are taken into account in a known manner. Due to the manufacturing tolerances, the aforementioned piston sealing gaps can be subjected to deviations that do not preclude undesired tolerances of the operating pressure in the gap 66. The negative effect of these piston sealing gaps can be precluded by providing in the shafts of the participating pistons (or in the inner surface of the pertaining bores) mounted sealing rings that nearly preclude leakage. The setting of the pressure in the gap 66 is then exclusively a function of the easier to control tolerances of the bore diameter of the restrictor 86 and of the capillary bore. It should also be noted that in the present situation the magnitude of the pressure in the gap 66 should, as described in conjunction with the embodiments of FIGS. 10 and 12, be slightly higher than the pressure level in the first pressure chamber 5 (FIG. 1). A reliable closing process of the valve as well as the maintenance of the energy-saving excess flow regulation of the second pressure chamber 9 utilizing the better smoothing condition of 5 (relative to the volume thrusts supplied to 9) are the desired effect.

A partial compensation of the opening force of the injector needle valve 42 is provided by the pressure shoulder 98 formed by the change in diameter of the double piston 101 from $d_3$ to $d_2$. The hydraulic effective surface of this shoulder, to which pressure from the first pressure chamber 5 is supplied, generates a force that operates in a closing sense and that together with the further force (force-initiating pressure originating from the gap 66) that engages in the same direction on the thin shaft of the double piston 101 has a magnitude that is sufficient not only to apply the necessary surface pressure at the sealing seat of the injector needle valve 42 but also to overcome the hydraulic opening force of the injector needle valve 42. When the valve is closed, this opening force of the alternating effect of the pressure (from the first pressure chamber 5) originates with the effective surface, characterized by the diameter difference (the injector needle valve portions $d_2-d_1$; With $d_1$ being the diameter of the axial projection of the conical surface of the tip of the injector needle valve, which is in contact with the sealing seat).

When the valve is opened, the displacement force that is transmitted from the injector needle valve shaft 74 and is in a direction for a further opening is greater to the extent that the hydraulic effective surface now extends over the entire diameter $d_2$. It must also be possible for this force to be reliably overcome by the previously described "closure force".

The process of opening the valve takes place in the same manner as described in conjunction with the system of FIGS. 10 and 12. By supplying the solenoid 25 with current, the magnetic flux in the adjustment member 26 is set to zero, which leads to a shortening of the rod 40. As a consequence of the excess displacement force of the injector needle valve in the opening direction, but also as a consequence of the brief discontinuation of the closure force that acts upon $d_3$, the entire movable unit, comprising the components first piston 43, double piston 101, and injector needle valve shaft 74, moves in an opening direction until the shortening of the rod 40 is stopped. In this connection, the opening stroke traveled can be electronically controlled to any desired magnitude in proportion to the electrical current impressed upon the solenoid 25.

During the opening process of the valve, but also while the valve remains in the open state, the volume of the gap 66 here also experiences an undiscernible increase that during closure of the valve results in a brief (slight) increase of the surface pressure in the valve seat, which effectively increases the reliability of the closure process.

In conclusion, it should be noted that it is also possible to accentuate the rectangular pulse series (FIGS. 5 to 9) generated by the pulse duration modulator 24 (FIG. 2) within the time interval $t_g$ to a direct voltage level having the same sign as the square-wave voltage within the time duration $t_g$ per summing amplifier. The result is that during the process of the movement modulation the injector needle valve no longer closes the sealing seat within the respective phase of the controlled downstroke. This means that the injection process is no longer interrupted within the time duration $t_g$, but rather experiences only an "intensification modulation", which holds out the prospects of advantages with regards to suppressing undesired large drop diameters in the drop magnitude spectrum.

The present invention is, of course, in no way restricted to the specific disclosure of the specification and drawings, but also encompasses any modifications within the scope of the appended claims.

What we claim is:

1. In a method of injecting fuel into a combustion chamber of an air compressing, spontaneous ignition, internal combustion engine, with an adjustment member of an injector being actuated electrically and being controlled via an electronic circuitry, with the fuel quantity being withdrawn from a pressure chamber, the improvement wherein:

said adjustment member acts upon a release sectional area of a restrictor means;

an adjustment member in the form of a magneto strictive rod is provided;

said release sectional area is controlled by a control voltage, generated by said electronic circuitry, and can be chronologically modulated; and said chronologically modulation of the movement sequence of said adjustment member is effected in black-and-white cycles, whereby during such cycle an injected fuel quantity can be determined by varying the ratio of opening duration to pulse interval in such a way that the injection process, which is periodically modulated and is continual over the entire injection duration, has a chronological progress of said ratio of opening duration to pulse interval as defined by the linear equation $U = U_0 + m \cdot t$ as the control voltage for movement sequence of said adjustment member, with $U_o$ being proportional to said ratio of opening duration to pulse interval, and m representing the slope of said control voltage line.

2. A method according to claim 1, in which said chronological modulation is effected in such a way that said ratio of opening duration to pulse interval is constant during an entire injection duration.

3. A method according to claim 1, in which the slope of m is such that said ratio of opening duration to pulse interval reaches a value of 1 prior to conclusion of the entire injection duration.

4. A method according to claim 1, in which said chronological modulation is effected in such a way that said ratio of opening duration to pulse interval is constant during an entire injection duration, and in which said chronological modulation is effected in such a way that the injection process, which is periodically modulated and is continual over the entire injection duration, has a chronological progress of said ratio of opening duration to pulse interval as defined by the linear equation $U = U_o + m \cdot t$ as the control voltage for the movement sequence of said adjustment member, with the $U_o$ being proportional to said ratio of opening duration to pulse interval and m representing the slope of said control voltage line, with the slope of m being such that said ratio of opening duration to pulse interval reaches a value of 1 prior to conclusion of the entire injection duration.

5. A method according to claim 1, in which said chronological modulation is effected in such a way that said injection process, which is continual over the entire injection duration, is effected in two stages, with a first one of said stages representing a pilot injection of very short duration that is followed after a pulse interval by a second one of said stages in the form of a main injection having a long duration.

6. A method according to claim 1, in which increasing and decreasing amplitudes of said black-and-white modulated movements of said adjustment member have a harmonic curve configuration, with the increasing amplitude following the expression $0.5 \ A_0 \ (-\cos 2\pi \ ft) + 0.5 \ A_0$, and the decreasing amplitude being determined by the expression $0.5 \ A_0 \ (\cos 2\pi \ ft) + 0.5 \ A_0$, which are valid for the interval $$0 < t < \frac{1}{2f},$$

where $A_0$ is the magnitude of the intended displacement of said adjustment member, and f represents a frequency that is smaller by at least a factor of 0.707 than the mechanical resonance frequency of said adjustment member.

7. A method according to claim 6, in which said pulse interval is equal to the inverse of the lowest frequency f of the combustion chamber resonant vibration modes.

8. An apparatus for carrying out the method of claim 1, wherein said electronic circuitry comprises a microprocessor and peripheral units including a pulse duration modulator, a digital-analog converter, and a performance range register, with said microprocessor being controlled via three means that determine the operating parameters of speed, start of injection, and load, with said three means including a first pulse generator for determining speed via a starter ring gear, a second pulse generator that cooperates with an engine camshaft, and a slider for determining load via a potentiometer that is connected with a gas pedal, with said first pulse generator being connected to said microprocessor via a zero crossing detector, with said second pulse generator being connected to said microprocessor via a pulse processing unit, and with said slider being connected to said microprocessor via an analog-digital converter for processing signals; said pulse duration modulator is connected to a solenoid of said adjustment member via a pulse shaping stage that is followed by a voltage/current converter.

9. An apparatus according to claim 8, which includes a summing amplifier having two inputs for receiving output signals from said pulse shaping stage and from a free running constant frequency generator, with said summing amplifier conveying said output signals as a summation signal to said solenoid of said adjustment member via said voltage/current converter.

10. An apparatus according to claim 9, in which said pulse duration modulator is controlled by a voltage/time function, the momentary value of which, in conformity with the actual engine state parameters, and obtained from signals of said three means process in said microprocessor, is released from said performance range register in a correctly timed manner, triggered with the aid of a marking pulse generated at a beginning time point of said camshaft in such pulse processing unit, and, via said digital-analog converter, is fed as a control voltage, in analog form, to an input of said pulse duration modulator, whereby said modulation is previously activated in a correct phase via a start-stop signal, and whereby said modulator in turn, proportional to a momentary magnitude of said control voltage, controls the pulse duration of individual, internally generated rectangular pulses that follow one another at a constant frequency, with the pulse sequence frequency $$f = \frac{1}{t_a}$$

being manually adjustable via a second potentiometer.

11. An apparatus according to claim 9, in which said pulse shaping stage comprises a resonant circuit formed from a charge reversal inductor and a capacitor that are connected in parallel, with the inherent frequency of said resonant circuit being resonated such that said frequency is $$f = \frac{1}{2\pi \sqrt{L \cdot C}} \leq 0.707 \ f_0,$$

where L is the inductance of said charge reversal inductor, C is the capacitance of said capacitor, and $f_0$ is the inherent frequency of said adjustment member, with said resonant circuit being impressed via a compensating register and a first switch connected in series therewith to a constant input voltage, whereby said first switch is an electronic switch having a switching cycle that satisfies the relationship $$\frac{L}{R} < \tau < \frac{1}{2f},$$

where $\tau$ is a minimum closure duration of said first switch; and in which a second switch is provided that is disposed in series with said charge reversal inductor, which similarly has an electronic configuration and serves to change the charge of said capacitor, with the organization of the duration and point in time of switching of said first switch and of said second switch originating from a control logic, and with an adjusting capacitor voltage being overlapped with a constant voltage in said summing amplifier before being conveyed to said voltage/current converter.

12. An apparatus according to claim 11, in which said control logic for influencing said first and second switches is configured in such a way that a rectangular pulse leaving said pulse duration modulator passes a Schmitt trigger, from an inverting as well as noninverting output of which a respective monoflop having a pulse duration of $$\frac{1}{2f}$$

is served, with the outputs of said monoflops in an or-gated manner, making available a monoflop function for controlling said second switch, and with a third monoflop having a pulse duration $$\left(\frac{1}{2f} + \tau\right)$$

being triggered from the inverting output of said Schmitt trigger, from the output voltage of which the output voltage of the monoflop function is subtracted, via a differential former, in order to obtain the control voltage for controlling said first switch.

13. In an apparatus for carrying out the method of claim 1, whereby said adjustment member for a needle valve of an injector is actuatable via a solenoid that is controlled by such electronic circuitry, with fuel being supplied at the injector valve from pressure chamber means via injection line means, the improvement wherein:
- a first pressure chamber, which is supplied with pressure from an injection pump, is embodied as a tube that is inclined relative to a horizontal, with said tube extending over an entire length of a row of cylinders;
- a second pressure chamber is connected in parallel with said first pressure chamber via a connecting line that is provided with a relief valve and a back pressure regulating function;
- an injector holder of said injector is connected via a first connector and an injection line to said first pressure chamber, and via a second connector and a pressure line to said second pressure chamber, with fuel being conveyed to an injector body from said first connector via a first bore in said injector holder, and to said injector body from said second connector via a second bore in said injector holder, with said first bore opening into a pressure chamber of said injector body and being disposed immediately ahead of injection bores of a multi-hole jet and with said second bore opening into said injector body in a region between said adjustment member and said injector needle valve;
- said injector needle valve and said adjustment member are connected via coupling means; and
- said adjustment member comprises a magneto strictive rod that is disposed within said solenoid.

14. An apparatus according to claim 13, in which said coupling means comprises a first and second piston that are disposed in a common bore of said injector body in such a way as to be freely axially displaceable relative to one another, whereby between said pistons a gap is provided that via a capillary bore in said first piston and via further bore means communicates with a leakage line; disposed in said common bore of said injection body, at the level of central transverse planes of each of said pistons, are respective annular grooves into which branch lines of said second bore in said injector body open; and in which said first piston cooperates with said rod and said second piston cooperates with said injector needle valve, whereby disposed below said second piston remote from said first piston is a leakage groove that opens into said leakage line.

15. An apparatus according to claim 14, in which said second piston of said coupling means is formed by an upper portion of said injector needle valve.

16. An apparatus according to claim 15, in which said first piston has a greater diameter than does said second piston portion of said injector needle valve.

17. In an apparatus for carrying out the method of claim 1, whereby said adjustment member for a needle valve of an injector is actuatable via a solenoid that is controlled by said electronic circuitry, with fuel being supplied at the injector valve from pressure chamber means via injection line means, the improvement wherein:
- a first pressure chamber, which is supplied with pressure from an injection pump, is embodied as a tube that is inclined relative to a horizontal, with said tube extending over an entire length of a row of cylinders, and with said injector being connected to said first pressure chamber via a connector and an injection line, with said connector communicating with an injection body via a bore in an injector holder, with said injection body having a pressure chamber in the vicinity of an injection bore;
- said injector needle valve is embodied as an injector needle valve shaft that is axially movably disposed in a bore of said injector body and is held in a closed position by a cup spring pair disposed in an upper region remote from said pressure chamber of said injector body, whereby in the vicinity of this pressure chamber, said injector needle valve shaft is embodied as a differential piston having a first and second pressure surface, with said first pressure surface being larger than said effective second pressure surface to ensure said closed position;
- said injector holder is provided with a leakage line;
- a lower end of said adjustment member is coupled to said injector needle valve shaft, while an upper end of said adjustment member is provided with an auxiliary piston; and
- said adjustment member comprises a magneto strictive rod that is disposed within said solenoid.

18. An apparatus according to claim 17, in which one end of said auxiliary piston is connected via a spacer with said rod of said adjustment member, and another end of said auxiliary piston communicates with a damping chamber that in turn communicates via a restrictor and said connector with said first pressure chamber, whereby a venting bore that cooperates with said restrictor provides for a prescribed pressure in said damping chamber, and whereby leakage is returned via a passage and a further connector to a tank.

19. An apparatus according to claim 17, in which said auxiliary piston is replaced by an expanding wedge-type bearing means disposed in a recess of a housing of a spacer disposed at an upper end of said rod of said adjustment member, with said expanding wedge-type bearing means comprising a first and second wedge-shaped part, which for radial guidance are surrounded by first and second springs and first and second segments, with wedge surfaces of said wedge-shaped parts that contact one another having a wedge angle.

20. An apparatus according to claim 19, in which said magneto strictive rod, which cooperates with said expanding wedge-type bearing means, is electromagnetically excited via said solenoid in such a way that the excitation conforms to the equation $H = H0 \cdot \sin(2\pi f \cdot t)$, where $H0$ denotes the magnetic excitation and $f$ the frequency thereof, whereby the alternating-current amplitude triggered in said rod by H is kept very small ($\leq 1 \mu m$), with the excitation frequency f being equal to or greater than the inherent frequency of the base natural mode of said magneto strictive rod and being at least of an order of magnitude that ensures a periodic opening of said contacting wedge surfaces of said wedge-shaped parts of said expanding wedge-type bearing means.

21. In an apparatus for carrying out the method of claim 1, whereby said adjustment member for a needle valve of an injector is actuatable via a solenoid the is controlled by said electronic circuitry, fuel being supplied at the injection va from pressure chamber means via injection line means, the improvement wherein:

a pressure chamber, which is supplied with from an injection pump, is embodied as a tube that is inclined relative to a horizontal, with said tube extending over an entire length of a row of cylinders, and with said injector being connected via an injection line, a bore in an injector holder, and a restrictor with a gap disposed between said rod of said adjustment member and said injector needle valve, with said injector needle valve being embodied as a differential piston having a pressure shoulder, whereby a first piston and a double piston are disposed between said rod and said injector needle valve, with the diameters of said injector needle valve, said pressure shoulder, and said double piston respectively being coordinated with one another in such a way that a closing force is applied entirely hydraulically.

* * * * *

UNITED STATES PATENT AND TRADEMARK OFFICE
CERTIFICATE OF CORRECTION

PATENT NO. : 5,280,773
DATED : January 25, 1994
INVENTOR(S) : Dietmar Henkel

It is certified that error appears in the above-indentified patent and that said Letters Patent is hereby corrected as shown below:

On the title page, Item [73]: Assignee should read --MAN Nutzfahrzeuge AG, Munchen, Federal Republic of Germany--

Title page, Add: Attorney, Agent, or Firm --Robert W. Becker & Associates--

Signed and Sealed this

Twenty-first Day of June, 1994

Attest:

BRUCE LEHMAN

Attesting Officer  Commissioner of Patents and Trademarks